US012608474B2

(12) United States Patent
Ruoff et al.

(10) Patent No.: US 12,608,474 B2
(45) Date of Patent: Apr. 21, 2026

(54) MANAGING RISK CONTENT OF AN ELECTRONIC FILE

(71) Applicant: IMAGESOURCE, INC., Tumwater, WA (US)

(72) Inventors: Thomas M. Ruoff, Davidsonville, MD (US); Gabriel E. Ruoff, Davidsonville, MD (US)

(73) Assignee: ImageSource, Inc., Tumwater, WA (US)

( * ) Notice: Subject to any disclaimer, the term of this patent is extended or adjusted under 35 U.S.C. 154(b) by 117 days.

(21) Appl. No.: 18/622,309

(22) Filed: Mar. 29, 2024

(65) Prior Publication Data

US 2024/0330463 A1 Oct. 3, 2024

Related U.S. Application Data

(60) Provisional application No. 63/493,467, filed on Mar. 31, 2023.

(51) Int. Cl.
| | |
|---|---|
| *G06F 21/00* | (2013.01) |
| *G06F 16/178* | (2019.01) |
| *G06F 21/56* | (2013.01) |

(52) U.S. Cl.
CPC ........ *G06F 21/568* (2013.01); *G06F 16/1794* (2019.01); *G06F 21/565* (2013.01)

(58) Field of Classification Search
CPC .. G06F 21/565; G06F 16/1794; G06F 21/568; G06F 21/00; G06F 21/50;
(Continued)

(56) References Cited

U.S. PATENT DOCUMENTS

| | | | | |
|---|---|---|---|---|
| 11,201,876 | B2 * | 12/2021 | Kallos | ................. H04L 63/1408 |
| 12,500,909 | B1 * | 12/2025 | Westenberger | ..... H04L 63/1416 |

(Continued)

FOREIGN PATENT DOCUMENTS

| | | | |
|---|---|---|---|
| WO | WO 2022/162379 | 8/2022 | |
| WO | WO-2022162379 A1 * | 8/2022 | ............. G06N 20/20 |

OTHER PUBLICATIONS

International Search Report and Written Opinion for Application No. PCT/US2024/022346, mailed Jun. 10, 2024, 12 pages.

*Primary Examiner* — Josnel Jeudy
(74) *Attorney, Agent, or Firm* — Krista A. Wittman

(57) ABSTRACT

A method for managing risk content associated with an electronic file includes receiving a selection of at least one of a depth of risk content removal or a confidence level associated with the risk content removal in which the electronic file satisfies a threshold confidence value and applying one or more policies based on the selection to process the electronic file by selectively implementing an iterative routine which includes: removing risk content from the electronic file according to a first policy by implementing a first content and disarm (CDR) tool policy to obtain a first processed electronic file, and based on whether a first inspection indicates the first processed electronic file satisfies one or more predetermined conditions, removing risk content from the first processed electronic file according to a second policy by implementing a second CDR tool policy to obtain a second processed electronic file or passing the electronic file.

18 Claims, 10 Drawing Sheets

(58) Field of Classification Search
CPC ......... H04L 63/00; H04L 63/02; H04L 63/10; H04L 63/14
USPC .......................................................... 726/24
See application file for complete search history.

(56)                      References Cited

U.S. PATENT DOCUMENTS

| | | | |
|---|---|---|---|
| 2007/0282951 A1* | 12/2007 | Selimis ................... | H04L 67/75 709/205 |
| 2019/0012458 A1* | 1/2019 | Fausak .................. | G06F 21/565 |
| 2019/0268352 A1 | 8/2019 | Goh et al. | |
| 2019/0311118 A1 | 10/2019 | Grafi | |
| 2021/0173928 A1 | 6/2021 | Grafi et al. | |
| 2021/0319096 A1* | 10/2021 | Bae .......................... | G06F 21/51 |
| 2023/0401288 A1* | 12/2023 | Dubin ................... | G06F 18/217 |

* cited by examiner

5000

5100 — RECEIVE A FILE FOR PROCESSING

5200 — IDENTIFY TYPE OF FILE AND CONVERT FILE TYPE AS NEEDED

5300 — RECEIVE SELECTION OF POLICIES AND/OR CONFIGURATIONS TO APPLY FOR FILE PROCESSING

5400 — APPLY ONE OR MORE RULE/POLICY ENGINES BASED ON THE SELECTED POLICIES AND/OR CONFIGURATIONS TO PROCESS THE FILE

5500 — PROVIDE OUTPUT BASED ON A RESULT OF THE PROCESSING THE FILE

5600 — STORE OUTPUT

MANAGING RISK CONTENT OF AN ELECTRONIC FILE

CROSS-REFERENCE TO RELATED APPLICATIONS

This application claims priority to and the benefit of U.S. Provisional Patent Application No. 63/493,467 filed on Mar. 31, 2023, the entire disclosure of which is incorporated herein by reference for all purposes.

FIELD

The disclosure relates generally to methods, computing systems, computing devices, and computer products for managing risk content with respect to a digital or electronic file. More particularly, risk content with respect to the digital file can be managed according to a specified depth, user impact, confidence level, and the like, for example, through a recursive workflow.

BACKGROUND

Organizations including businesses, governmental entities, educational institutions, and the like, suffer from cyber-security incidents which negatively impact the organizations and those they serve (e.g., in financial, reputational, and safety terms).

Existing technologies to reduce risk associated with digital file include the use of content disarm and reconstruction (CDR) products and malware (risk) content detection. CDR vendors and commercial products employing CDR technology use a single CDR product to remove risk content for a file. Malware (risk) content detections generally use static analysis (e.g., for review of software), dynamic analysis (e.g., during execution of software in a synthetic environment), and artificial intelligence (AI) techniques. However, such methods may be insufficient for organizations to operate with an acceptable risk tolerance or even define and enforce a digital risk content tolerance.

SUMMARY

Aspects and advantages of embodiments of the disclosure will be set forth in part in the following description, or can be learned from the description, or can be learned through practice of the example embodiments.

In one or more example embodiments, a computer implemented method for managing risk content of an electronic (digital) file is provided. For example, the method includes receiving, by one or more processors, an electronic file; receiving, by the one or more processors, a selection of at least one of a depth of risk content removal or a confidence level associated with the risk content removal in which the electronic file satisfies a threshold confidence value; and applying, by the one or more processors, one or more policies based on the selection to process the electronic file by selectively implementing an iterative routine, the iterative routine including: removing risk content from the electronic file according to a first policy by implementing a first content and disarm (CDR) tool policy to obtain a first processed electronic file, in response to a first inspection with respect to the first processed electronic file indicating the first processed electronic file does not satisfy one or more predetermined conditions, removing additional risk content from the first processed electronic file according to a second policy by implementing a second CDR tool policy to obtain a second processed electronic file, and in response to the first inspection indicating the first processed electronic file satisfies the one or more predetermined conditions, passing the electronic file. A CDR tool may employ one or more commercial CDR products. The commercial CDR products may be configured so that the output of one is the input to a second. This is a CDR commercial product series configuration. Associated multiple commercial CDR products is hence referred to as the CDR tool. A first CDR tool refers to the associated commercial CDR products aligned according to an initial configuration of settings for each commercial CDR product. The second and third CDR tools refer to the associated commercial CDR products aligned according to a subsequent configuration of settings for each commercial CDR product.

In some implementations, the method includes identifying a file type of the electronic file. In some implementations, the file type of the electronic file is determined based on request for comments nomenclature.

In some implementations, the method includes, based on the identified file type of the electronic file, converting the electronic file from a first file type to a second file type before removing the risk content from the electronic file according to the first policy.

In some implementations, the first inspection includes a static inspection of the first processed electronic file, and the one or more predetermined conditions include a result of the static inspection having an output of a number of indicators being less than a threshold indicator value.

In some implementations, the first inspection includes a dynamic inspection of the first processed electronic file when the result of the static inspection has the output of the number of indicators being more than the threshold indicator value, and the one or more predetermined conditions include a result of the dynamic inspection being a benign dynamic finding.

In some implementations, the one or more predetermined conditions are not satisfied when the first inspection with respect to the first processed electronic file includes a result of the static inspection having an output of a number of indicators being greater than a threshold indicator value.

In some implementations, the one or more predetermined conditions are not satisfied when the first inspection with respect to the first processed electronic file includes a result of the dynamic inspection being a malicious finding or a suspicious finding.

In some implementations, the second CDR tool has a greater number of settings enabled (than the initial CDR tool) to remove the additional risk content from the first processed electronic file according to the second policy than a number of settings enabled by the first CDR tool to remove the risk content from the electronic file according to the first policy.

In some implementations, the iterative routine further includes: in response to a second inspection with respect to the second processed electronic file indicating the second processed electronic file does not satisfy the one or more predetermined conditions, removing further risk content from the second processed electronic file according to a third policy by implementing a third CDR tool to obtain a third processed electronic file, and in response to the second inspection indicating the second processed electronic file satisfies the one or more predetermined conditions, passing the electronic file.

In some implementations, the third CDR tool has a greater number of settings enabled to remove the further risk content from the second processed electronic file according to the third policy than a number of settings enabled by the second CDR tool to remove the additional risk content from the first processed electronic file according to the second policy.

In some implementations, the confidence level associated with the risk content removal in which the electronic file satisfies the threshold confidence value is selected from a plurality of confidence levels corresponding to respective threshold confidence values.

In some implementations, the threshold confidence values include at least a first threshold confidence value, a second threshold confidence value which is greater than the first threshold confidence value, and a third threshold confidence value which is greater than the second threshold confidence value, and each of the threshold confidence values are determined values obtained from retrospective analysis of a plurality of electronic files. The threshold confidence level value is a policy factor and may be quantitative or qualitative.

In some implementations, the first CDR tool and second CDR tool are determined based on the file type.

In some implementations, the method includes providing, by the one or more processors, a user interface to receive one or more inputs selecting the at least one of the depth of risk content removal or the confidence level associated with the risk content removal in which the electronic file satisfies the threshold confidence value. In some implementations, the method includes calculating an estimated response and recovery cost from ingestion of the electronic file based on based on a probability that the electronic file contains risk content, an amount of electronic files ingested per a predefined time period, a probability that a computing system associated with a user will prevent harm to the computing system when the electronic file contains risk content, and an expected cost of an incident or breach if the computing system does not prevent harm to the computing system when the electronic file contains risk content; and providing, for presentation via a user interface, the estimated response and recovery cost.

In one or more example embodiments, a computing device (e.g., a laptop, tablet, smartphone, personal computer, server, etc.) is provided. The computing device may include at least one memory to store instructions and at least one processor configured to execute the instructions to perform any of the operations of the methods described herein. For example, the operations may include receiving an electronic file; receiving a selection of at least one of a depth of risk content removal or a confidence level associated with the risk content removal in which the electronic file satisfies a threshold confidence value; and applying one or more policies based on the selection to process the electronic file by selectively implementing an iterative routine, the iterative routine including: removing risk content from the electronic file according to a first policy implemented by a content and disarm (CDR) tool policy to obtain a first processed electronic file, in response to a first inspection with respect to the first processed electronic file indicating the first processed electronic file does not satisfy one or more predetermined conditions, removing additional risk content from the first processed electronic file according to a second policy implemented by the CDR tool policy to obtain a second processed electronic file, and in response to the first inspection indicating the first processed electronic file satisfies the one or more predetermined conditions, passing the electronic file. The first inspection may include a static inspection of the first processed electronic file and a dynamic inspection of the first processed electronic file when results of the static inspection do not satisfy a first predetermined condition among the one or more predetermined conditions, the first predetermined condition including a result of the static inspection having an output of a number of indicators being less than a threshold indicator value, and the one or more predetermined conditions including a second predetermined condition corresponding to the dynamic inspection having a result corresponding to a benign dynamic finding. The iterative routine can further include in response to a second inspection with respect to the second processed electronic file indicating the second processed electronic file does not satisfy the one or more predetermined conditions, removing further risk content from the second processed electronic file according to a third policy implemented by the CDR tool policy to obtain a third processed electronic file, and in response to the second inspection indicating the second processed electronic file satisfies the one or more predetermined conditions, passing the electronic file. The first, second, and third policies refer to the configuration settings of the commercial CDR products aligned in series. The iterative routine may involve multiple policies, not limited to the three described above.

In one or more example embodiments, a computer program is provided. The computer program may, when run on at least one processor, cause the at least one processor to perform any of the operations of the methods described herein.

In one or more example embodiments, a computer-readable medium (e.g., a non-transitory computer-readable medium) which stores instructions that are executable by at least one processor is provided. In some implementations the computer-readable medium stores instructions which may include instructions to cause the at least one processor to perform one or more operations which are associated with any of the methods described herein (e.g., operations of the computing device, the server computing system, etc.). For example, the operations may include receiving an electronic file; receiving a selection of at least one of a depth of risk content removal or a confidence level associated with the risk content removal in which the electronic file satisfies a threshold confidence value; and applying one or more policies based on the selection to process the electronic file by selectively implementing an iterative routine, the iterative routine including: removing risk content from the electronic file according to a first policy by implementing a first content and disarm (CDR) tool to obtain a first processed electronic file, in response to a first inspection with respect to the first processed electronic file indicating the first processed electronic file does not satisfy one or more predetermined conditions, removing additional risk content from the first processed electronic file according to a second policy by implementing a second CDR tool to obtain a second processed electronic file, and in response to the first inspection indicating the first processed electronic file satisfies the one or more predetermined conditions, passing the electronic file. The computer-readable medium may store additional instructions to execute other aspects of the computing device and/or the server computing system, as described herein.

In one or more example embodiments, a server computing system is provided. The server computing system may include at least one memory to store instructions and at least one processor configured to execute the instructions to perform any of the operations of the methods described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
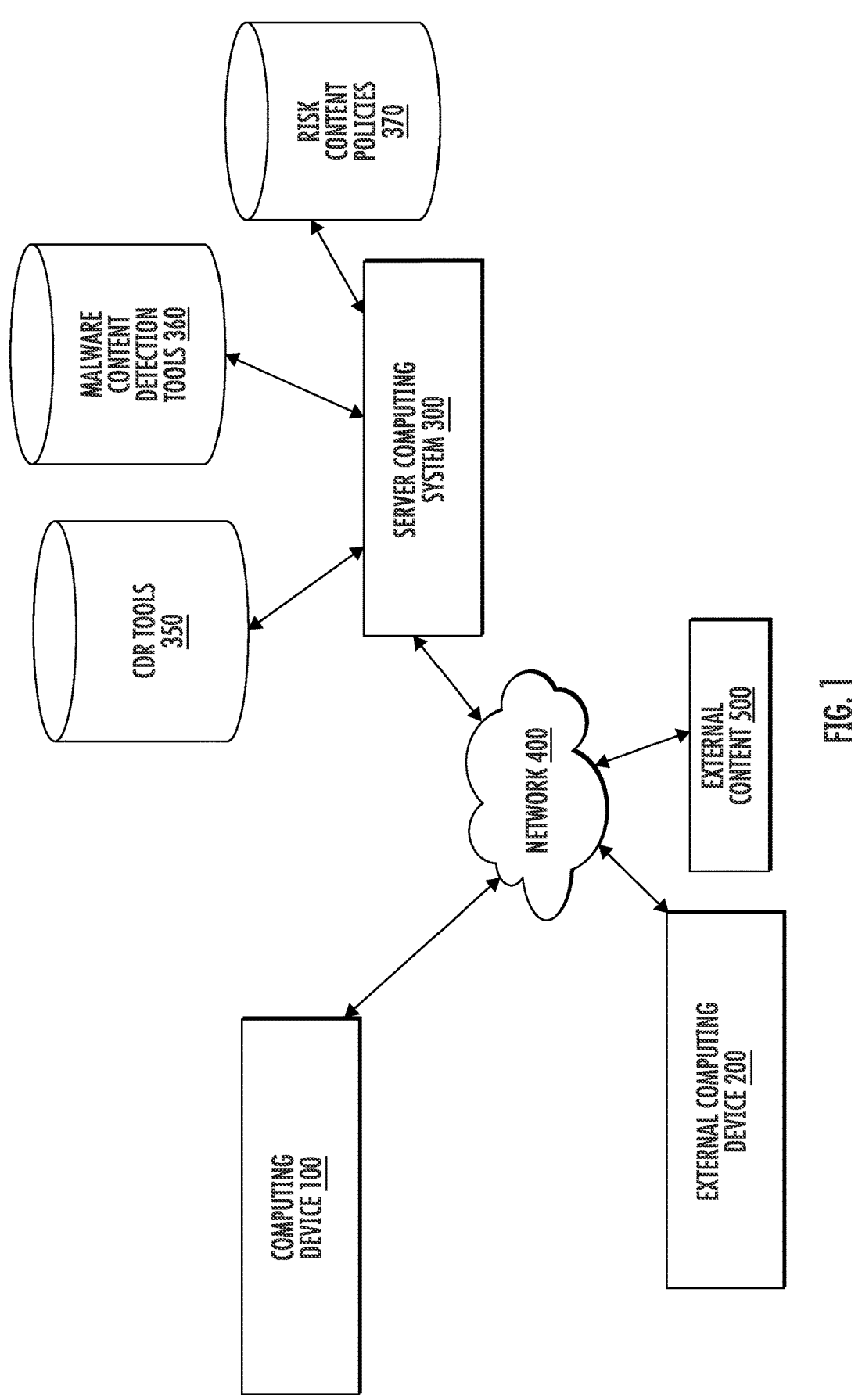
FIG. 1 depicts an example system according to according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Example embodiments of the disclosure are directed to methods, computing devices, computing systems, computing programs, and the like for managing (e.g., preventing, mitigating, reducing, etc.) risk content with respect to digital or electronic files, for example, according to a user specified depth, user impact, and confidence level. Aspects of the disclosure may be implemented with respect to files received via electronic mail, file transfer/sharing, and web downloading. Electronic or digital files may include software objects in a distinguishable format, such as portable document format (e.g., PDF files), Microsoft Word (e.g., doc files), and imagery (e.g., GIFF files), with an associated functional technical software specification describing allowable contents, structure, and software languages. Software objects file format is defined by the specifications maintained by the Internet Engineering Task Force (IETF) in the form of a Request for Comment (RFC) filing. Examination of software objects for correspondence to the file specification is conducted with the IETF RFC documentation.

One or more technical benefits may include improved security and efficiencies that reduce the probability of successful cybersecurity attacks to a defined acceptance risk level with tradeoffs of cost and operational user impact.

According to examples disclosed herein, an original digital file is input and processed to reduce risk content and is output in the same format as the original digital file, while having reduced risk content. There are, however, workflows in which the output of risk reduction processing and determination of risk content to a determined threshold specify the final software output is converted to a format not equal to the original digital file as a means to provide a high-confidence systems output.

Malware includes software written with the intention of causing harm to a victim. Risk content includes software that appears to be or could be malware. The determination of malicious intent is difficult to judge so software may be considered as potential malware if it has the potential to induce a negative impact. Because the impact of the software on a computer is often undeterminable it is considered a risk and is referred to as risk content. Risk content that is confirmed through conclusive observable means to have the capability and intention of inducing a compromise to the security policy of an IT system is considered malware.

The computing systems and methods described herein can assess the risk of harm to a computer caused by malicious software to protect the computer and associated IT devices which, if compromised, would have a negative impact on the enterprise. All malware is risk content but not all risk content is malware. According to examples of the disclosure, the computing systems and methods described herein can determine the presence of risk content using existing commercial detection products in a novel and improved manner. Detection products are commonly referred to as malware detection products. As there is a distinction between malware and risk content and determination of the extent of risk content is derived from use of malware detection products, confusion may arise in terminology. So, what is commonly called malware detection products is henceforward termed detection. According to examples of the disclosure, the computing systems and methods described herein can perform risk reduction associated with risk content by processing the original file through commercial products in a novel and improved manner. Risk content reduction products employ software analysis techniques including content detection and reconstruction (CDR). Aspects of the disclosure include computing systems and methods which can combine existing detection and CDR technologies using a unique workflow and analytic techniques to produce a risk content reduced file with user specified confidence and tolerance of user impact and cybersecurity risk content allowance. Aspects of the disclosure include computing systems and methods which allow for the configuration of depth of risk content removal and the confidence in risk content removal. Removing risk content may have noticeable effects. Selection of risk content removal can be accomplished through configuration settings. A particular configuration of settings is a policy. Aspects of the disclosure allow for a single configuration setting interface that effects the configuration of the constituent existing CDR technologies. Aspects of the disclosure allow for the user to select an initial CDR risk content removal setting producing a processed file. The processed file is then examined by malware detectors. If a threshold of malware presence is found/exceeded, the processed file is then re-processed by the same CDR products but with a setting that removes more risk content. Increasing the enabled settings in the CDR products allows for an iterative system of sufficient risk content removal with allowable malware discovery. CDR products remove risk content while detectors find indicators of risk and, under certain conditions, malware. Again, malware is software that has been confirmed to have cause a compromise the security policy of the IT system in which the software is rendered. Identification of software as malware requires a preponderance of evidence based upon prior exposure and knowledge. Detection products producing a verdict of malicious upon examination of the software sample are used to assess the presence of risk content.

Aspects of the disclosure include computing systems and methods which integrate multiple CDR capabilities with detection capabilities in a recursive workflow, starting with a limited set of CDR content removal options and if risk content is detected, sending the CDR processed file back through the CDR tools using a more extensive set of CDR content removal options until the risk tolerance (e.g., the absence of malware) is achieved or a specified number of cycles is attained and the subject file blocked, converted to a known format, or passed.

Aspects of the disclosure include computing systems and methods which integrate the two classes of capabilities with unique workflows and analytic techniques to reduce malware (risk) content in digital objects, files, and the like.

CDR tools may process files via the following process. First, an original file is examined to determine a file type, for example, via the Internet Engineering Task Force (IETF) request for information (RFI) scheme. For example, a file type may be determined as a MICROSOFT WORD document (.doc, .docx, .docm, and the like). Next, the original file is parsed into the components of the file RFI. Then, the components are de-obfuscated/transformed into an examinable form. The components are examined using a policy rule engine and acceptable content is copied and put into a new document container of the same type as the original file. Policy rule engines are the human readable form of the CDR technology element configuration setting, which include settings that stipulate the content to be copied into the new document container. As more rules are enacted, more risk content can be removed or a greater level of rule complexity can be implemented. The mapped content is completed, that is, the content of the original file is examined and manipulated in accordance with the policy engine rules and a new file is created. The newly created file may be referred to as the CDR processed file (CDRPF). The CDRPF is sent as an output of the product. In current approaches, the original file is sent once through this process, and thus there is only one CDR processing stage. According to examples of the disclosure however, computing systems and methods described herein can implement CDR technologies in series (e.g., the output of a first CDR product is the input of a second CDR product) to produce a product with an intentionally reduced risk content level of acceptance. The term "CDR tool" or "CDR tools" are capabilities that are composed of two or more commercial CDR products aligned in series.

Examples of the disclosure include computing systems and methods which combine a determination of the original file risk content using detection analysis tools (e.g., static and/or dynamic analysis), conduct CDR operations, and pass the CDRPF through detection analysis processes/tools to determine the residual risk content and include such information in a workflow process, and re-employ CDR tools with a more restrictive CDR policy to output a file of lower risk content, and output another CDR processed file (CDR2P) using a second policy (CDRP2P).

There is a trade off with enacting all CDR options for removal of risk content and user impact. The more content that is removed, the lower the risk of malware presence in the processed file. However, the more content that is removed, the larger the user impact. For example, some features of a file may be removed which would otherwise be available or accessible to a user. In addition, employing dynamic detection analysis (DA) may be time consuming (e.g., about 10 minutes per file, depending on tool details) and incur an operational impact and possible economic impact. As an example, if the original file is sent to DA and the CDRPF is sent to DA and the CDR2P file is sent to DA, the cycle may take approximately 20 minutes to complete. The computing systems and methods described herein may consider tradeoffs such as these in offering or automatically selecting various policies to implement for managing risk content (e.g., for a base CDR policy, a secondary policy referred to as CDR2P, a tertiary policy referred to as CDR3P, and any additional policies). In summary, when a process entails more processing to ostensibly enhance security, there can be an additional cost (e.g., in terms of computer resource usage and/or time) resulting in a tradeoff between security and cost and operational usability.

In addition, according to examples of the disclosure the computing systems and methods described herein can provide a confidence level needed to determine how many SA indicators are warranted to pass the CDRPF to DA, as a policy setting.

The number of SA indicators is used to stipulate the cutoff for CDRPF to be sent to DA. For example, when the number of SA indicators is set to a relatively low number, a higher confidence level is achieved for determining suspicious and/or risk content since more files will be sent to DA than if the threshold was set to a relatively larger number. The number of static indicators is one metric and used as an example.

As described above, examples of the disclosure are directed to computing systems, methods, computing devices, computing programs, and the like which provide the capability to reduce the risk content in electronic or digital files. Risk content includes software included in an electronic file that is: (1) not included in the file type specification, referred to as the Request for Comments (RFC), as established by the Internet Engineering Task Force, or (2) content not possibly visible to the reader, (3) content that is identifiable by code type (java, pearl, C++, etc.) that is not included in the RFC but included for enhanced functionality, or (4) or software in the form of content within a file which is not commonly viewed by the human file reader (MS file history, comments, metadata, etc.).

Risk content may be removed using risk content removal tools (e.g., CDR tools). The measurement of the existence of risk content may be provided by detection tools. Examples of the disclosure are directed to computing systems and methods for managing the CDR and inspection processes so that an electronic file may be subjected to serial CDR processing and released (i.e., it has passed an external acceptance process and provided to the intended user) if a predetermined value of risk, as measured by detection tools, is returned. The detection tool output may include an indication that the content is at or below a predetermined risk threshold value. For example, a depth of CDR processing may be set (e.g., automatically by the computing system) or established by a user, as well as the threshold release from CDR processing. Therefore, aspects of the disclosure include computing systems and methods which implement a rule set that applies CDR tools and detection tools in a unique workflow, where CDR tools are responsible for the removal of risk content to the degree a CDR policy tool is set. For example, a CDR policy setting may allow or remove java software in a PDF file according to various conditions.

Aspects of the disclosure include computing systems and methods which can adjust a depth of risk content examination and risk content removal to enforce a risk policy to a level determined by the user and to the tolerance of users viewing altered files. For example, the more rules selected via the commercial CDR product administrative interface for content removal the more content is removed and the more noticeable the alterations are to the human view (i.e., a greater user impact). In addition, the more times dynamic detection analysis (DA) is invoked in the analysis process the greater the time delay in sending the output file. This is another element of user impact.

The computing systems and methods described herein may be configured to determine that risk content software included in a file is malicious, for example, if executed and the behavior of the software inside the execution environment is contrary to security policy. For example, risk content may include software inside of an electronic file which may, if executed, result in a negative outcome to the security posture of the host computer or the system the computer is connected to. Risk content does not need to be malicious but has the capability of posing a negative outcome to the security posture of the host computer. Malicious software exhibits behavior contrary to the enterprise security policy. As stated above, not all risk content is malware, but all malware is risk content. CDR processing attempts to removes risk content independent of a determination of a malicious nature (i.e., without regard of intent or capability). As noted above, malicious content includes software that has indications of being harmful through some examination process and is judged and termed malware. In the disclosure detection tools are configured (by the policy interface which is part of the disclosure) to measure and produce a report on the presence of malicious and or risk content. Aspects of the disclosure include computing systems and methods include examining or analyzing the static and dynamic tools' analysis report and extracting the portions related to determination of malware and malicious intent.

Removing risk content reduces the likelihood the processed file will exhibit behavior contrary to security policy. Aspects of the disclosure include computing systems and methods include determining whether to apply CDR processing to further reduce malware content in a file based on the measurement of malicious content by the static and dynamic tools. The subject file can be the original file, or a file processed using CDR technology.

Excluding commercial products employing CDR technology, cybersecurity products designed and sold to identify malware and provide protection against malware attacks are based on detection of malicious content. This is termed detection-based security. Detection-based security requires knowledge of the sample's characteristics to align to previously characterized software that has been determined to be malicious. This is pattern matching and can be conducted at the macro, micro, and systems behavior level. Software written in a unique way that does not correspond to a pattern of previously characterized malware alludes detection-based products and is referred to as a zero-day threat. Assuming all files have malware content and conducting CDR processing to convert the original file into a format with reduced likelihood of containing malware is referred to as zero trust. According to examples of the disclosure, the computing systems and methods described herein implement detection tools to perform iterative CDR processing until a risk tolerance is reached. In some implementations, the files are subjected to a determined level of CDR processing and the amount of risk content removed increases until the threshold for malicious content is reached. If the threshold is not reached, the file is either blocked or converted to a format with a very low likelihood of containing malware (e.g., an image file).

One or more technical benefits of the disclosure include reducing or mitigating the presence of malware software, also referred to as risk content, which enters computer systems and has a negative impact. Zero-day threats are a particular benefit of this disclosure. Cybersecurity incidents and breaches disrupt organizational operations and are costly in financial, reputational, and safety terms. Incidents and breaches originate from risk content in email attachments, web downloads, and file exchanges. The computing systems and methods described herein transform electronic file content of unknown risk into a form with a defined level of trusted content. The transport mechanism can be emailing attachments, web download/upload, file transfer protocol (FTP), removable media like thumb or portable hard drives, or movement of files in backup and recovery operations. As noted above, current non-CDR based cybersecurity techniques, like anti-virus, static and dynamic analysis of software, and comparative hash analysis (provenance) are based on detecting risk content (i.e., detection-based cybersecurity). Software not previously encountered (zero day threats) tends to be found at lower rates. Over time, most risk content that is malicious if found and characterized as malicious. Over time, the characterization of malware is disseminated and detection and protection products adopt the patterns of recognition, often called signatures. The time gap between introduction of risk content/malware and detection by methods cited above represents a deficiency which the computing systems and methods described herein uniquely address. True malware not seen before is risk content and the computing systems and methods described herein uniquely provide a means to enforce cybersecurity policy in conditions in which detection-based efforts are ineffective. Examples disclosed herein reduce the likelihood of electronic file based cyber-attacks by implementing a cybersecurity process that reduces risk content in electronic files by combining existing content disarm and reconstruction (CDR) and detection tools via a unique workflow with unique data analysis algorithms that influence decision logic in the workflow. For example, CDR processing may be conducted in a serial manner with a variable policy setting that is regulated by static and/or dynamic detection inspection results. Examples of the disclosure allow for CDR processing to a set level of content removal with malware inspection regulating the tolerance of risk content removal. Examples disclosed herein also may be applied to file types for which existing CDR processing products exist.

Thus, according to aspects of the disclosure, technical benefits such as resource savings and immersive view accuracy improvements may be achieved.

Referring now to the drawings, FIG. 1 is an example system according to one or more example embodiments of the disclosure. FIG. 1 illustrates an example of a system which includes a computing device 100, an external computing device 200, a server computing system 300, and external content 500, which may be in communication with one another over a network 400. For example, the computing device 100 and the external computing device 200 can include any of a personal computer, a smartphone, a tablet computer, and the like. The network 400 may include any type of communications network including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra-wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

As will be explained in more detail below, in some implementations the computing device 100 and/or server computing system 300 may form part of a risk content management system which can reduce the likelihood of electronic file based cyber-attacks by implementing a cyber-security process that reduces risk content in electronic files.

In some example embodiments, the server computing system 300 may obtain data, information, or tools from one or more of CDR tools 350, content detection tools 360, and risk content policies 370, to implement various operations and aspects of the risk content management system as disclosed herein. The CDR tools 350, content detection tools 360, and risk content policies 370 may be integrally provided with the server computing system 300 (e.g., as part of the one or more memory devices 320 of the server computing system 300) or may be separately (e.g., remotely) provided. Further, CDR tools 350, content detection tools 360, and risk content policies 370 can be combined or may be respectively provided in a separate manner. CDR tools 350, content detection tools 360, and risk content policies 370 can be accessed by computing device 100 via the server computing system 300 or without accessing the server computing system 300. In some implementations, one or more of the CDR tools 350, content detection tools 360, and risk content policies 370 may be integrated with the computing device 100 (e.g., as part of the one or more memory devices 120).

CDR tools 350 can store one or more commercial CDR tools (products) which process files to remove risk content. A CDR tool may include a program or software which is used to remove risk content from a file. Each of the CDR tools among the CDR tools 350 may perform the following process. First, the CDR tool examines an original file to determine a file type, for example, via the Internet Engineering Task Force (IETF) request for information (RFI) scheme. For example, a file type may be determined as a MICROSOFT WORD document (.doc, .docx, .docm, and the like). Next, the CDR tool parses the original file into the components of the file RFI. Then, the components are de-obfuscated/transformed into an examinable form. The CDR tool examines the components using a policy rule engine and acceptable content is copied and put into a new document container of the same type as the original file. Policy rule engines include settings that stipulate the content to be copied into the new document container by a commercial CDR product. As more rules are enacted a higher degree of fidelity is achieved in selecting the content in the original file to be included in the new document container. The CDR rule set may be included as part of the CDR tool. The risk content management system described herein can use the CDR rule set exposed by the CDR product manufacturer. The risk content management system described herein is configured to allow for multiple commercial CDR products to be used in series. For example, the risk content management system is configured to implement the multiple commercial CDR products in series based upon the selection of one or more risk content policies. For example, the one or more risk content policies may be selected via one or more inputs to a user interface, or may be automatically selected by the risk content management system. The risk content management system is configured to translate a selected risk content policy into the exact CDR tool configuration of provided rules. The mapped content is completed (that is, the risk content management system examines and manipulates the content of the original file in accordance with the policy engine rules) and a new file is created. The newly created file may be referred to as the CDR processed file (CDRPF). The CDRPF is sent as an output of the CDR tool set. The risk content management system described herein can allow for multiple commercial CDR products to be used in a serial configuration (output of one commercial CDR product is the input to a second commercial CDR product, the output of the second commercial CDR product is the input to the third commercial CDR product, and so on).

Content detection tools 360 can store static content detection tools and/or dynamic content detection tools. For example, a file may be analyzed or inspected according to static and dynamic methods. For example, a static tool may return a number of indicators of risk or malware (e.g., from zero to 250 indicators), or another metric related to the magnitude of discovered risk content, through a review of content without running the potential dynamic detection program. The risk content management system described herein can implement the static analysis tool to produce a report detailing the number of indicators of risk content. The risk content management system described herein implements a process by which the static analysis report is examined, and the number of indicators are retrieved and stored in a data base for examination. If the number of indicators equals or exceeds a predefined value, the file is then sent for dynamic analysis. For example, a dynamic tool may return a finding concerning a file (e.g., benign, suspicious, or malicious) through execution of the software sample and determine whether the behavior of the software sample indicates the presence of risk content or possible presence of malware.

Risk content policies 370 can include a plurality of risk content policies. In some implementations, a user may select one or more risk content policies to manage the risk content of a file. In some implementations, the risk content management system may be configured to (automatically) select one or more risk content policies to manage the risk content of a file (e.g., according to a default setting, according to a type of the file, according to a size of the file, etc.). Various possible risk content policies are described herein. The risk content policies 370 may be stored in a database, for example.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The computing device 100, external computing device 200, and server computing system 300 can access external content 500 over network 400. External content 500 can be searched by computing device 100, external computing device 200, and server computing system 300 according to known searching methods. For example, in some implementations, the risk content management system may be configured to access external content 500 to retrieve or download CDR tools, content detection tools, risk content policies, etc., for implementing the methods described herein.

Figure 2:
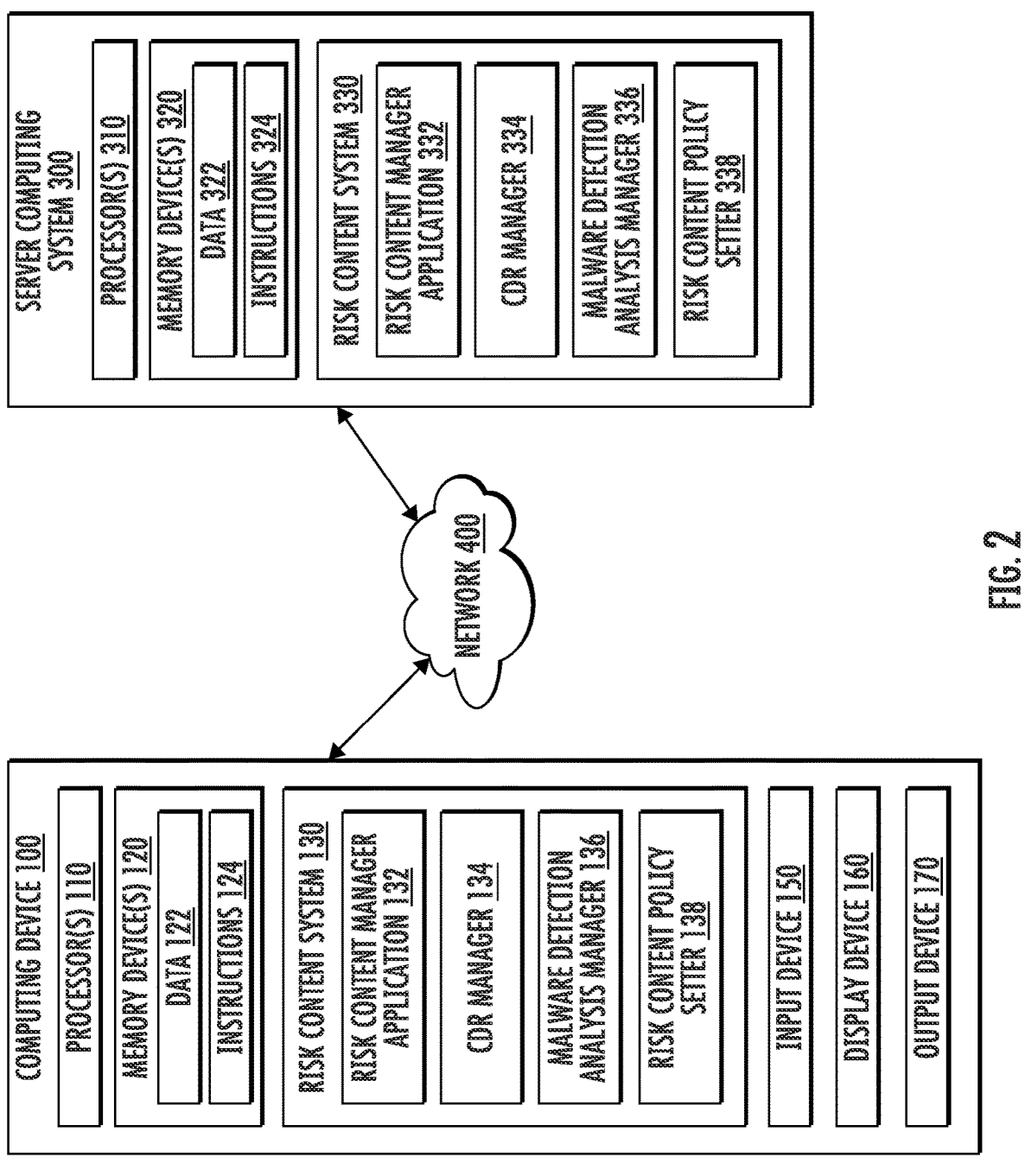
FIG. 2 depicts example block diagrams of a computing device and a server computing system according to one or more example embodiments of the disclosure.

Referring now to FIG. 2, example block diagrams of a computing device and server computing system according to one or more example embodiments of the disclosure will now be described. For example, the computing device 100 alone, the server computing system 300 alone, or the computing device 100 and server computing system 300 taken together may form the risk content management system described herein. Although computing device 100 is represented in FIG. 2, features of the computing device 100 described herein are also applicable to the external computing device 200.

The computing device 100 may include one or more processors 110, one or more memory devices 120, a risk content system 130, an input device 150, a display device 160, and an output device 170. The server computing system 300 may include one or more processors 310, one or more memory devices 320, and a risk content system 330.

For example, the one or more processors 110, 310 can be any suitable processing device that can be included in a computing device 100 or server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions 124, that when executed, cause the one or more processors 110 to execute risk content manager application 132, and to execute the instructions to perform operations including: receiving a selection of at least one of a depth of risk content removal or a confidence level associated with the risk content removal in which the electronic file satisfies a threshold confidence value and applying one or more policies based on the selection to process the electronic file by selectively implementing an iterative routine. The iterative routine can include: removing risk content from the electronic file according to a first policy by implementing a first content and disarm (CDR) policy to obtain a first processed electronic file, and based on whether a first inspection indicates the first processed electronic file satisfies one or more predetermined conditions, removing risk content from the first processed electronic file according to a second policy by implementing a second CDR policy to obtain a second processed electronic file (an output file having risk content removed in accordance with the risk content policy) or passing the electronic file, as described according to examples of the disclosure. For example, the one or more memory devices 320 can store instructions 324, that when executed, cause the one or more processors 310 to execute risk content manager application 332, and to execute the instructions to perform operations including: receiving a selection of at least one of a depth of risk content removal or a confidence level associated with the risk content removal in which the electronic file satisfies a threshold confidence value and applying one or more policies based on the selection to process the electronic file by selectively implementing an iterative routine. The iterative routine can include: removing risk content from the electronic file according to a first policy by implementing a first content and disarm (CDR) tool policy to obtain a first processed electronic file, and based on whether a first inspection indicates the first processed electronic file satisfies one or more predetermined conditions, removing risk content from the first processed electronic file according to a second policy by implementing a second CDR tool policy to obtain a second processed electronic file (an output file having risk content removed in accordance with the risk content policy) or passing the electronic file, as described according to examples of the disclosure. Again, the CDR tool may be comprised of multiple CDR commercial products aligned in series. The CDR tool policy is a configuration of the CDR commercial products settings.

The one or more memory devices 120 can also include data 122 and instructions 124 that can be retrieved, manipulated, created, or stored by the one or more processors 110. In some example embodiments, such data can be accessed and used as input to execute the risk content manager application 132, as described according to examples of the disclosure. The one or more memory devices 320 can also include data 322 and instructions 324 that can be retrieved, manipulated, created, or stored by the one or more processors 310. In some example embodiments, such data can be accessed and used as input to execute the risk content manager application 332, as described according to examples of the disclosure.

In some example embodiments, the computing device 100 includes the risk content system 130. For example, the risk content system 130 may include a risk content manager application 132, a CDR manager 134, a detection analysis manager 136, and a risk content policy setter 138.

According to examples of the disclosure, the risk content manager application 132 may be executed by the computing device 100 to provide a user of the computing device 100 a way to manage risk content of a file which is received by the computing device 100. In some implementations, the risk content manager application 132 may provide a graphical user interface by which a user can select one or more risk content policies which are to be applied with respect to a received file, for example, via the risk content policy setter 138. The risk content policy setter 138 may also be configured to add risk content policies, delete risk content policies, or modify existing risk content policies. For example, there may be a plurality of risk content policies, each being configurable, for example, to set threshold values concerning a number of indicators that are detected by static analysis via malware detection analysis manager 136, to set threshold values concerning confidence values via detection analysis manager 136, to set a number of CDR stages to be applied by CDR manager 134, and the like. In some implementations, the risk content manager application 132 may be configured to automatically select one or more risk content policies which are to be applied with respect to a received file, for example, via the risk content policy setter 138. The risk content manager application 132 may be configured to automatically select the one or more risk content policies which are to be applied with respect to the received file, for example, based on a default setting, based on one or more of a file type of the received file, a size of the received file, a risk tolerance associated with the user (e.g., according to a preference of the user), a risk tolerance associated with an organization, etc.

Additional aspects of the risk content manager application 132 are described further herein. In some examples, one or more aspects of the risk content manager application 132 may be implemented by the risk content manager application 332 of the server computing system 300 which may be remotely located. In some examples, one or more aspects of the risk content manager application 332 may be implemented by the risk content manager application 132 of the computing device 100.

The computing device 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), an output sound device (e.g., a speaker), a track ball, a remote controller, a portable (e.g., a cellular or smart) phone, a tablet PC, a pedal or footswitch, a virtual-reality device, and so on. The input device 150 may also be embodied by a touch-sensitive display having a touchscreen capability, for example. For example, the input device 150 may be configured to receive an input from a user associated with the input device 150, for example, to select a risk content policy via risk content policy setter 138.

The computing device 100 may include a display device 160 which displays information viewable by the user (e.g., a user interface screen, etc.). For example, the display device 160 may be a non-touch sensitive display or a touch-sensitive display. The display device 160 may include a liquid crystal display (LCD), a light emitting diode (LED) display, an organic light emitting diode (OLED) display, active-matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 160 can be used by the risk content system 130 installed on the computing device 100 to display information to a user relating to a risk content removal process (e.g., information relating to a risk content policy, a user interface screen having user interface elements which are selectable by the user, return on investment information regarding implementing various policies, etc.).

The computing device 100 may include an output device 170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. According to various examples of the disclosure, the output device 170 may provide an indication which is associated with a result concerning the risk content removal process. For example, a warning indication may be output via a speaker and/or a light source in response to detecting the presence of malware, in response to an output from a static analysis failing or being below a threshold level, in response to an output from an dynamic analysis failing or being below a threshold level, etc.

In accordance with example embodiments described herein, the server computing system 300 can include one or more processors 310 and one or more memory devices 320 which were previously discussed above. The server computing system 300 may also include a risk content system 330.

For example, the risk content system 330 may include a risk content manager application 332 which performs functions similar to those discussed above with respect to risk content manager application 132.

For example, the risk content system 330 may include a risk content manager application 332, a CDR manager 334, a detection analysis manager 336, and a risk content policy setter 338 which perform operations similar to those already described with respect to the risk content manager application 132, CDR manager 134, and detection analysis manager 136, respectively. Therefore, operations of those features will not be repeated again for the sake of brevity.

Figure 3A:
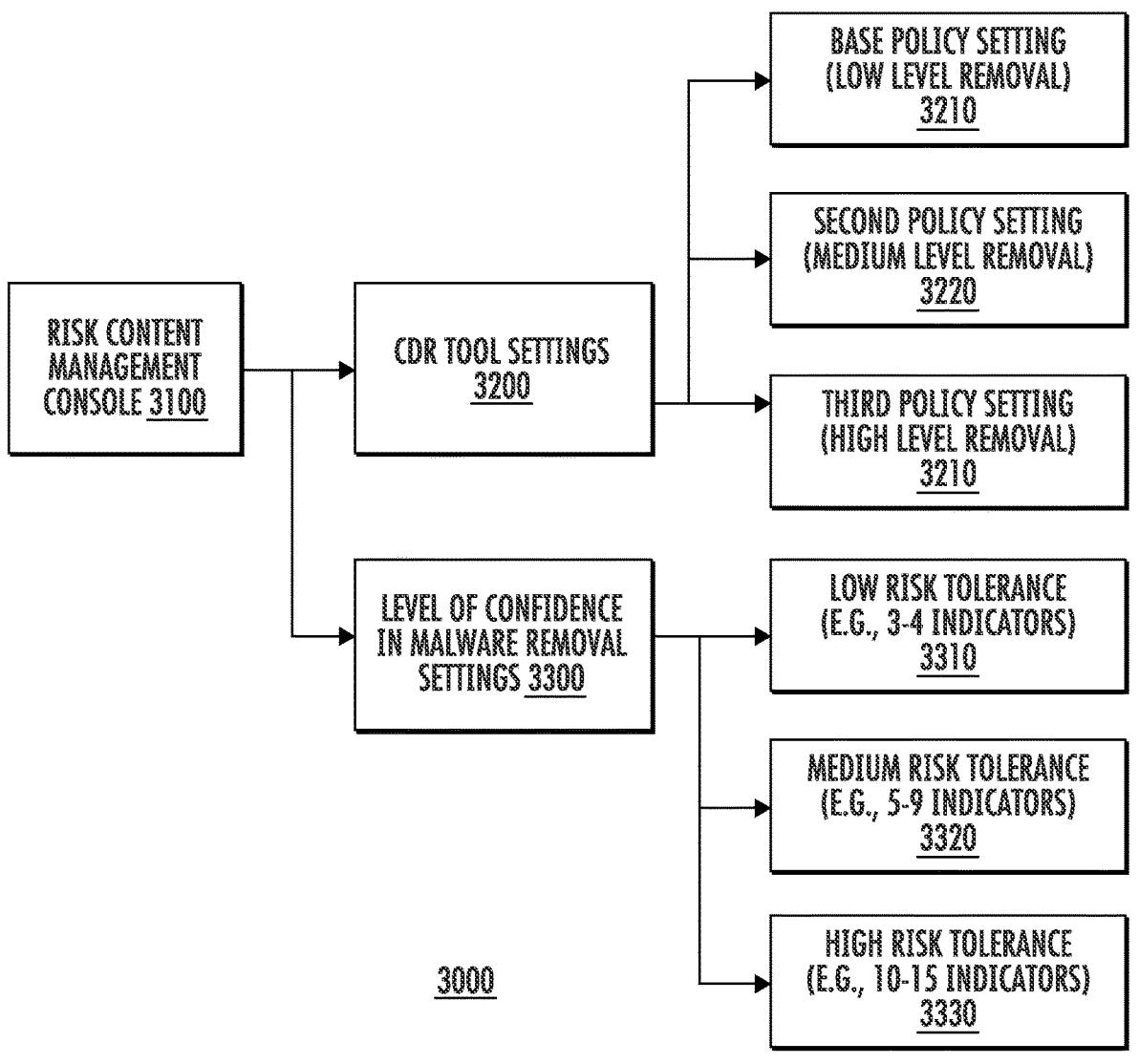
FIG. 3A illustrates a flow diagram of an example, non-limiting computer implemented method, according to one or more example embodiments of the disclosure.

Examples of the disclosure are also directed to computer implemented methods for managing risk content with respect to a file. FIG. 3A illustrates a flow diagram of an example, non-limiting computer-implemented method, according to one or more example embodiments of the disclosure. The flow diagram of FIG. 3A illustrates a method 3000 for managing or reducing risk content associated with an electronic file, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 3A, an example method 3000 is shown to illustrate operations for managing or reducing risk content with respect to an electronic file.

According to examples of the disclosure, the computing device 100 may be configured to implement the method 3000 which includes an iterative process to successively remove more risk content by applying a base policy and then adding more risk content rules depending on a measurement of risk content indicators arising from the detection process. The base policy itself may be a user selected setting, for example, via a graphical user interface presented on the display device 160, or selected automatically by the computing device 100.

For example, two adjustment options or controls may be provided, for example, via a risk content management console 3100 (e.g., via a graphical user interface provided on computing device 100).

Figure 3B:
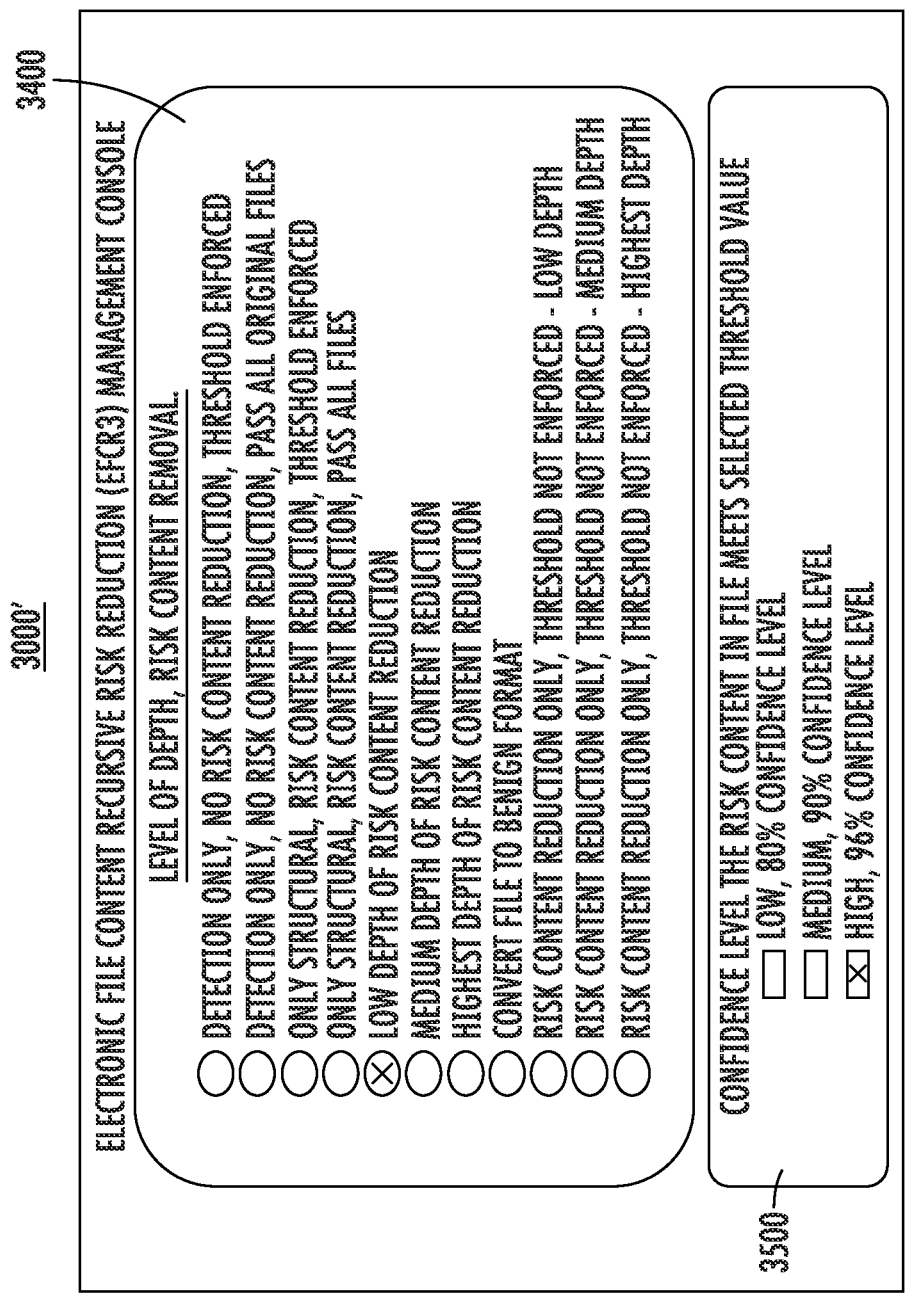
FIG. 3B illustrates an example risk content management console including a user interface for managing risk content with respect to a file, according to one or more example embodiments of the disclosure.

Referring to FIG. 3B, an example risk content management console is shown to illustrate a user interface for managing risk content with respect to an electronic file. For example, user interface screen 3000' provides selectable options by which a user can provide one or more inputs selecting a level of depth and degree of risk content removal and/or selecting a confidence level by which a risk content file can be determined as meeting a threshold value to be passed on.

Referring back to FIG. 3A, a first adjustment option may include a CDR tool setting 3200 whereby a level of risk content removal (i.e., a number of commercial CDR product settings) can be selected. The more settings which are enabled, the more risk content which is removed, resulting in a lower likelihood that software characterized as malware is present in the file being processed. Also, the more settings which are implemented, the more modifications to the file, and the higher the user impact.

A second adjustment option may include selecting a level of confidence in malware removal 3300. The level of confidence may correspond to a threshold value for detection returns. For example, static tools may return a number of indicators of risk content (e.g., from 0 to 250 indicators).

The threshold value may be established by examining a set of files known (well characterized and signatures commonly found in the detection community) to be either benign or malicious from dynamic analysis and determining static analysis threshold values according to various confidence levels which are statistically determined values of metrics that may include quantitative values derived from retrospective analysis (e.g., 98%, 90%, 80%, etc.) in being either benign, suspicious, or malicious. Dynamic inspection tools may be configured to return a finding of benign, suspicious, or malicious. The confidence level and threshold value refer to the number of indicators allowed in a processed file to allow passing. The higher the number the more likely the presence of risk content that may be eventually determined to the malware, where a determination that the file is "suspicious" has indicators risk content and software eventually determined to be malware greater than a determination that the file is "benign" and a determination that the file is "malicious" has indicators of risk content malware greater than a determination that the file is "suspicious."

As described above, in some implementations, a plurality of sensitivity settings (confidence levels) are provided. Some sensitivity settings allow the user to pass files with little likelihood of malware but incurs a possible user impact and more computer processing time (more consumption of computing resources) and cost. Conversely, some sensitivity settings allow for a higher risk tolerance, allowing for content that has likelihood of some malicious content but little user impact and lower processing requirements (less consumption of computing resources).

Example policies that can be implemented by the computing device 100 (risk content system 130, risk content manager application 132) may include four possible outcomes (e.g., four high level policy settings). The first outcome is the condition in which CDR processing is disabled (no CDR process is evoked to remove the risk content) and the logic to pass, block, or transform the file is based solely on the results found in the static analysis (SA) and dynamic analysis (DA) processing reports. For example, the computing device 100 (risk content system 130, risk content manager application 132) may be configured to pass those files found to be within the threshold, block those files not within the threshold, or transform those files not within the threshold into a benign format. The second outcome is when the computing device 100 (risk content system 130, risk content manager application 132) sends the CDR processed files to the SA and DA process and the reports indicate the CDR processed file is in conformance with the threshold for passing the processed file or if more processes are required. The third outcome is a policy for a single pre-set CDR risk content removal configuration and the SA and DA evaluations are disabled by the computing device 100 (risk content system 130, risk content manager application 132) so all CDR processed files are sent to the output of each file for risk content determination, and no CDRs processing is enacted. The fourth high level policy setting relies on the original file SA indicator count found in the SA report as the logical enabler to evoke CDR processing. For this policy, the computing device 100 (risk content system 130, risk content manager application 132) references or utilizes the SA indicator count threshold to determine if the file is sent to CDR processing or just passed to the output process. If the SA indicator count exceeds a threshold value, the policy resolves to the second high level policy condition. The four policies have associated logic, workflow, SA tools, DA tools, and CDR settings. Policy and configuration settings are described below.

For example, risk content policies 370 can include a policy which only scores the files and the CDR processes are disabled. This case equates to risk content discovery and all the files are sent to the output process unless the SA and DA reports indicate values above a threshold. For example, the threshold to block or transform files may be set at a number of SA indicators above a predetermined number (e.g., 3 indicators), or some threshold metric found in a CA tool report, and with a DA report content of suspicious or malicious. This policy also includes the possibility of passing all files regardless of SA and DA report findings. This policy setting may also be used to examine archived files to assess historical files to determine efficacy of evoked risk content controls. As an example, to determine the efficacy of an added control used in a file transfer process (e.g., a new commercial product designed for malware detection and blocking tool installed six months prior), the computing device 100 (risk content system 130, risk content manager application 132) may be configured to examine the files before and after implementation of the added control. Such an example would allow such an implementation to retrospectively discover the level of risk content in files previously consumed.

The risk content manager application 132 may be configured to implement a set policy option when risk content is not removed below the threshold value. For example, if risk content is not removed in conditions such the detection analysis results are below a threshold value, settable policy options which can be implemented by the risk content manager application 132 include: (a) block the file from passing and possibly informing the intended recipient; (b) convert the file to a format that has no executable code, like an image (JPEG) or PDF; or (c) pass the file to a next process with a notification to the user and a systems administrator, possibly using email or text or another means.

For example, risk tolerance may be expressed by the computing device 100 (risk content system 130, risk content manager application 132) providing a user interface via the risk content management console 3100 by which a user can select an option which corresponds to a number of SA indicators found from processing a file and/or a confidence level, or another metric found in a SA report. For example, the option may be represented as a whole number. The number may be greater than 0 and less than some level of indicators. For example, a value of 3 may correspond to an 80% confidence level, and a number of 15 may correspond to a 98% confidence level. The more risk indicators found in the SA report generated from processing a file, the higher the confidence there is risk content. Conversely, the absence of SA risk indicators reflects the probability the file contains no risk content/malware.

For clarity, SA may be implemented by the computing device 100 (risk content system 130, risk content manager application 132) in two decision processes. First, the computing device 100 (risk content system 130, risk content manager application 132) is configured to determine if the CDR processes file should be sent to DA. Second, the computing device 100 (risk content system 130, risk content manager application 132) is configured to determine if a CDR processed file satisfies a threshold value for passing on to the end user by examination of the detection analysis output data. As noted above, SA tools examine files and seek patterns matching around 250 templates. If the file is found to have a capability (template match), an indicator is enabled for inclusion in the SA report. The higher the number of SA indicators, the greater the likelihood the file will cause harm to the recipient (e.g., an IT system) if executed because the sample bears a high resemblance to previously observed software concluded to be malicious. Most files used in computing systems (e.g., IT systems) today have little risk content but SA tools will find correspondence to 1 or 2 templates or a similar metric. These are false positive detection results, a noise level which requires interpretation or filtering of outputs. This means a file purposely written with zero risk content but has a credit card number or valid URL will result in 1 or 2 indicators enabled in the SA report. A SA threshold to send to DA of 1 means almost all files will be sent to DA, creating a delay in users getting the file and cost of processing. This also means there is higher confidence malware is found. If the SA threshold is set around 10 indicator counts, or similar metric, to be sent to DA or release, the likelihood of a malware being sent to the end user is lower than if the number of indicators is low, like 1. For example, a low-risk content tolerance setting (e.g., base policy setting 3210) may be selected by a user who desires to have no risk content in the examined file or may be selected automatically by the computing device 100. The low tolerance setting is the most conservative and allows the fewest number of static analysis indicators found risk indicator bore files to pass. Dynamic analysis is less granular with returns of benign, suspicious, malicious. The policy or rule set could include prohibiting delivery of a file to the intended user if the file is deemed malicious by DA. For example, a low tolerance setting 3310 may correspond to a setting of 3 indicators to 4 indicators.

For example, a medium tolerance setting 3320 may be selected by a user who may allow for some risk content in the examined file or may be selected automatically by the computing device 100. Therefore, more risk content may be allowed in passed files from the static analysis perspective. For example, a medium tolerance setting may correspond to a setting of 5-9 indicators or a similar metric.

For example, a high tolerance setting 3330 may be selected by a user who is less risk adverse and may allow for possibility of risk content in the examined file. The trade-off for a high tolerance setting is the user impact on readable content and reduced processing time/user delay, while allowing more risk content for the file version that is passed from static analysis. For example, a high tolerance setting may be selected by the user or may be selected automatically by the computing device 100. The high tolerance setting may correspond to a setting of 10-15 indicators found in SA (or a similar metric) and DA for a determination of benign.

In some implementations, the computing device 100 (risk content system 130, risk content manager application 132) is configured to receive a selection of an option which corresponds to a desired CDR processing option to set a level of risk content removal. For example, the selection may be received via the user interface via the risk content management console 3100 according to various settings by which the user can select the option. In some implementations, the computing device 100 (risk content system 130, risk content manager application 132) may automatically select an option which corresponds to a CDR processing option to set a level of risk content removal. The computing device 100 (risk content system 130, risk content manager application 132) may automatically select the option based on a default setting, based on user preferences regarding a tolerance preference, based on an organization's preferences regarding a tolerance preference, based on a file type, based on a file size, based on a source (sender) of the file, based on a history of receiving similar files, based on a history of receiving files from the sender, based on time limitations for processing the electronic file, based on computing resource limitations of the computing device 100, etc.

For example, as a first option, the file can be scored by the detection computing device 100 (risk content system 130, risk content manager application 132) to indicate a degree of risk content without actually performing any CDR processing. In more detail, the original file is sent to static analysis and a number of risk indicators are provided back (with details if desired). If the number of risk indicators exceeds a threshold limit, the computing device 100 (risk content system 130, risk content manager application 132) may be configured to subject the file to dynamic analysis. A return (output) from the first option corresponds to a score that indicates the number of SA indicators found.

For example, the workflow loop with SA and DA report content excluded from the logic exists. In this example, all files are processed by the CDR workflow and all are sent to the output process.

For example, the file may be classified by the computing device 100 (risk content system 130, risk content manager application 132) as "Low Risk tolerance" 3310 with a score=1 if the number of indicators is 0-1, a score=2 if the indicator count is 2-3, and a score=3 if the indicator count is 4-5 (which can correspond to a threshold value). When the number of static indicators is less than the threshold value no dynamic analysis is needed. The indicator count is one method to assess risk content, however other metrics could be used. This abstraction relates to all previous and subsequent examples.

For example, the file may be classified by the computing device 100 (risk content system 130, risk content manager application 132) as "Medium Risk tolerance" 3320 with a score=4 if the number of static indicators is more than the threshold value, a score=5 if the number of static indicators is more than the threshold value by two and the dynamic indicator is benign, and a score=6 if the number of static indicators is more than the threshold value by four and the dynamic indicator is suspicious.

For example, the file may be classified by the computing device 100 (risk content system 130, risk content manager application 132) as "High Risk tolerance" 3330 with a score=7 if the number of static indicators is above the threshold value and the dynamic indicator is malicious, a score=8 if the number of static indicators is above the threshold value by five and the dynamic indicator is malicious, a score=9 if the number of static indicators is above 10 and the dynamic indicator is malicious, and a score=10 if the number of static indicators is above 20 and the dynamic indicator is malicious. The above example values for scores and number of static indicators are examples only, and other values may be used to categorize risk tolerances. Individual SA tools examine files slightly differently, as do dynamic tools. The same file may elicit indicator values for SA tools ranging from 0 to 5 or, for a file with known high-risk content (one written for test purposes), from 10-25. This same condition relates to DA tools. Different from previous methods, the computing device and methods described herein allow for integration of any SA and DA tool sets to be used with a common policy to produce outputs that correspond to a definable risk content threshold.

For example, as a second option, the computing device 100 (risk content system 130, risk content manager application 132) can be configured to process the file via CDR to remove risk content according to various policy settings.

For example, a low level of risk content removal policy may be employed by the computing device 100 (risk content system 130, risk content manager application 132) via a base policy (BP) as one of the CDR policy settings. Here, commercial CDR products that constitute the CDR tool may have limited policy settings enacted to remove properties and history.

For example, a medium level of risk content removal policy may be employed by the computing device 100 (risk content system 130, risk content manager application 132) via a second policy (2P) as another one of the CDR tool policy settings. According to the second policy (2P), the CDR tools have more settings enacted and human visible impact is sometimes noted.

For example, a high level of risk content removal policy may be employed by the computing device 100 (risk content system 130, risk content manager application 132) via a third policy (3P) as another one of the CDR policy settings. According to the third policy (3P), the commercial CDR products that constitute the CDR tool may have all of the configuration settings enabled. The 3P would impose the greatest level of risk content options, thus providing the highest level of risk content removal options as a policy.

In some implementations, the computing device 100 (risk content system 130, risk content manager application 132) may be configured to implement a particular type of CDR tool policy (low level, medium level, or high level) according to the number of indicators detected using SA and/or a classification determined by the DA (benign, suspicious, malicious).

For example, as a third option, the computing device 100 (risk content system 130, risk content manager application 132) can be configured to process the file according to an emergency setting in which the original file is subjected to a protocol conversion process rending the original software inert. Protocol conversion may be accomplished by evoking a commercially available software product or set of products according to an orchestrated work flow. Such a protocol conversion reduces the vulnerabilities inherent in the original file format and eliminates the user option to execute the software in the file format environment. For example, the original file may be one that executes in a program like Microsoft Word (doc). The conversion could be to an image format such as JPEG, or converted from a PDF to a JPEG or another format which has a low capacity to support executable software inherited from the original file. Such protocol conversions have significant operational user impact. This policy option balances reduction of risk content and providing the end user the original file in a visual format without ability to manipulate.

For example, as noted above as a fourth option, the computing device 100 (risk content system 130, risk content manager application 132) can be configured to not implement any detection tools and the file is processed using the CDR tool, with no threshold set concerning the number of indicators detected. Costs (e.g., financial as well as latency costs) may be reduced according to the fourth option since no detection tools are used but the fourth option does allow for selection of a level of risk content removed (i.e., low level, medium level, or high level).

Examples of the disclosure are also directed to user-facing aspects by which a user can request a particular setting for managing risk. For example, FIG. 3B illustrates an example user interface screen 3000' which serves as an electronic file content recursive risk reduction management console. As shown in FIG. 3B, in some implementations, the user interface screen 3000' may include a first portion 3400 which includes a plurality of policy settings by which CDR processes and risk content removal depths can be varied. For example, the first portion 3400 may include user interface elements which are selectable (e.g., via a checkbox, a pull-down menu, etc.). However, the disclosure is not limited to these examples and other methods for selection may be implemented (e.g., via a voice input). For example, in FIG. 3B there are at least eleven policy settings by which CDR processes and sanitization depths can be varied:

Setting #1: Detection Only, No Risk Content Removal, Threshold Enforced

Setting #2: Detection Only, No Risk Content Removed, Pass All Original Files

Setting #3: Only Structural Risk Content Removed, Threshold Enforced

Setting #4: Only Structural Risk Content Removed, Pass All Files

Setting #5: Low Depth of Risk Content Removal

Setting #6: Medium Depth of Risk Content Removal

Setting #7: Highest Depth of Risk Content Removal

Setting #8: Convert File to Benign Format; Highest Level of Risk Content Removal Setting #9: Risk Content Removal Only, Threshold Not Enforced-Low Depth, base, 2P or 2p possible policy settings Setting #10: Risk Content Removal Only, Threshold Not Enforced-Medium Depth, base, 2P or 2P possible policy settings Setting #11: Risk Content Removal Only, Threshold Not Enforced-Highest Depth, base, 2P or 2p possible policy settings.

The below table illustrates various workflows for each of the eleven settings:

| Risk Content Removal Depth Setting | File to be processed | Sensitivity Setting | Pre-CDR Inspection type and results (For SI, A = Above or B = Below Threshold; For DI, B = benign, M = malicious, S = suspicious) | CDR Policy | CDR output file designation | Post CDR Inspection type and result | Action Pass, resubmit to new policy, transform to benign format |
|---|---|---|---|---|---|---|---|
| Setting #1 No CDR tool enacted (no Risk Content Removal), Only Detection, Threshold Enforced | OF | Low, Medium or High | SI/B; SI/B and DI/B-S; SI/B and DI/M; SI/A and DI/M; SI/A and DI/B-S | None | None | SI/B; SI/B and DI/B-S; SI/B and DI/M; SI/A and DI/M; SI/A and DI/B-S | Pass OF; Pass OF; Block or Transform; Block or Transform; Block or Transform |
| Setting #2 No CDR tool enacted (no Risk Content Removal), Only Detection, Threshold Not Enforced | OF | Low, Medium or High | SI/B; SI/B and DI/B-S; SI/B and DI/M; SI/A and DI/M; SI/A and DI/B-S | None | None | SI/B; SI/B and DI/B-S; SI/B and DI/M; SI/A and DI/M; SI/A and DI/B-S | Pass OF; Pass OF; Pass OF; Pass OF; Pass OF |
| Setting #3 Only Structural Content Changed through CDR tool actions, Threshold Enforced | OF | Low, Medium, or High | SI/B; SI/B, DI/B-S; SI/A, DI/B-S; SI/A, DI/M; SI/A, DI/B-S | Only Enable Structural Analysis (SA) | CDRBPF | SI/B, SI/B, DI/BS SI/B, DI/B-S SI/A, DI/BS SI/A, DI/M SI/A, DI/BS SI/B, DI/BS SA/A, DI/B-S SA/B, DI/B-S | Pass CDRSAF Pass CDRSAF Pass CDRSAF Blocks or transform CDRSAF Block or Xform Block or Xform Pass CDRSAF Block or xform Pass CDRSAF |

| Risk Content Removal Depth Setting | File to be processed | Sensitivity Setting | Pre-CDR Inspection type and results (For SI, A = Above or B = Below Threshold; For DI, B = benign, M = malicious, S = suspicious) | CDR Policy | CDR output file designation | Post CDR Inspection type and result | Action Pass, resubmit to new policy, transform to benign format |
|---|---|---|---|---|---|---|---|
| Setting #4 Only Structural Content Changed through CDR tool actions, Threshold Not Enforced | OF | Low, Medium, or High | SI/B<br>SA/A, DI/B-S<br>SA/A, DI/M | Structural Analysis Only | CDRSAF | NA | Pass CDRSAF |
| Setting #5: Low Depth of Risk Content Removal through CDR tool actions | OF<br>DRBPF<br>CDR2PF | Low, Medium, or High | SI/B<br>SI/A, DI/B-S<br>SI/A, DI/B-S or<br>SI/A, DI/M<br>SI/A, DI/B-S or<br>SA/B, DI/M | Base Policy<br>Base Policy<br>CCR2P<br>CCR3P | CDRBPF<br>CDRBPF<br>CDR2PF<br>CDR3PF | SI/B<br>SI/A, DI/BS or SI/A, DI/M<br>SI/B, DI/BS<br>SI/A, DI/B-S or SA/B, DI/M<br>SI/B, DI/BS<br>SI/A, DI/BS or SI/B, DI/M | Pass<br>Send CDRBPF to CDR2P<br>Pass<br>CCR2PF<br>Send CDR2PF to CDR3P<br>Pass<br>CDR3PF<br>Block or xform |
| Setting #6: Depth of Risk Content Removal through CDR tool actions | OF<br>CDRBPF<br>CDR2PF | Low, Medium, or High | SI/B<br>SI/A, DI/B-S<br>SI/A, DI/B-S or<br>SI/A, DI/M<br>SI/A, DI/B-S or<br>SA/B, DI/M | Base Policy<br>Base Policy<br>CCR2P<br>CCR3P | CDRBPF<br>CDRBPF<br>CDR2PF<br>CDR3PF | SI/B<br>SI/A, DI/BS or SI/A, DI/M<br>SI/B, DI/BS<br>SI/A, DI/B-S or SA/B, DI/M<br>SI/B, DI/BS<br>SI/A, DI/BS or SI/B, DI/M | Pass<br>CDRBPF<br>Send CDRBPF to CDR2P<br>Pass<br>CCR2PF<br>Send CDR2PF to CDR3P<br>Pass<br>CDR3PF<br>Block or xform<br>Pass |
| Setting #7: High Depth of Risk Content Removal through CDR tool actions | OF<br>CDRBPF<br>CDR2PF | Low, Medium, or High | SI/B<br>SI/A, DI/B-S<br>SI/A, DI/B-S or SI/A, DI/M<br>SI/A, DI/B-S or SA/B, DI/M | Base Policy<br>Base Policy<br>CCR2P<br>CCR3P | CDRBPF<br>CDRBPF<br>CDR2PF<br>CDR3PF | SI/B<br>SI/A, DI/BS or SI/A, DI/M<br>SI/B, DI/BS<br>SI/A, DI/B-S or SA/B, DI/M<br>SI/B, DI/BS<br>SI/A, DI/BS or SI/B, DI/M | CDRBPF<br>Send CDRBPF to CDR2P<br>Pass<br>CCR2PF<br>Send CDR2PF to CDR3P<br>Pass<br>CDR3PF<br>Block or xform |

-continued

| Risk Content Removal Depth Setting | File to be processed | Sensitivity Setting | Pre-CDR Inspection type and results (For SI, A = Above or B = Below Threshold; For DI, B = benign, M = malicious, S = suspicious) | CDR Policy | CDR output file designation | Post CDR Inspection type and result | Action Pass, resubmit to new policy, transform to benign format |
|---|---|---|---|---|---|---|---|
| Setting #8: Convert File to Benign Format | OF | NA | NA | Xform or re-fry | PDF or default xformed format | NA | Pass xformed or re-fried file |
| Setting #9-#11: Risk Content Removal enacted through CDR tool, Threshold Not Enforced - Low, Medium and High Depth of Risk Content Removal | OF | Low, Medium and High | NA | CDRBP | CDRBPF | NA | Pass CDRBPF |

As shown in FIG. 3B, in some implementations, the user interface screen 3000' may include a second portion 3500 which includes a plurality of policy settings to set a confidence level based on the number of static indicators and the dynamic indicator level. For example, in FIG. 3B there are at least six policy settings are shown which can be selected to set a confidence level based on the number of static indicators and the dynamic indicator level. For example, there are two variations of a low confidence level, two variations of a medium confidence level, and two variations of a high confidence level. For example, the second portion 3500 may include user interface elements which are selectable (e.g., via a checkbox, a pull-down menu, etc.). However, the disclosure is not limited to these examples and other methods for selection may be implemented (e.g., via a voice input).

As described herein, aspects of the disclosure relate to a workflow for managing or reducing risk content for a file. The risk content manager application 132 implements logic, routines, rules, and the like to govern the movement of a file to various elements (e.g., a CDR process, static analysis, dynamic analysis, etc.). Another aspect of the disclosure is related to the recursive use of the CDR tool based upon a risk scoring of the CDR processed files. For example, risk content manager application 132 links the output of static and dynamic electronic file inspection tools to settings for CDR risk content removal in an iterative routine. If risk content is not removed at a first attempt (as judged by the static and dynamic inspection tools), an increased depth of risk removal by the CDR tools is applied (through a configuration change in which more rules are applied to remove content in the commercial CDR products that constitute the CDR tool) along with an increase in the depth of static and dynamic risk inspection.

Software may be determined by the risk content manager application 132 to be (or identified as) risk content (software type) by examination of the software through static and dynamic analysis techniques. Static inspection (SI) and dynamic inspection (DI) identify and categorize risk content. In the context of CDR processing techniques, risk content may be categorized by the type of software it is, and not by what it does or may do. Comparing the risk content in a file processed by the CDR tool (using the first, second, or multiple policies) with the risk content in the original file may be achieved by SI and DI tools via the risk content manager application 132. Such comparison provides information to assess the value of the system administrator.

As noted above, risk content can be removed by employing the CDR tool. The CDR tool is comprised of multiple commercial CDR products aligned serially. Aspects of the disclosure include the computing device 100 (risk content system 130, risk content manager application 132) implementing the CDR tool such that the constituent commercial CDR products are constructed in a specific serial order (e.g., in a format specific order). For example, an output file produced by a first commercial CDR product may be provided by the risk content manager application 132 as an input into a second commercial CDR product. The output of the second commercial CDR product may be provided as an input to a third commercial CDR product, and so on. Ordering of the commercial CDR products to achieve a CDR tool use may be file type dependent. For example, when there are two commercial CDR products that comprise the CDR tool (e.g., CDR1 and CDR2) and various file types, the computing device 100 (risk content system 130, risk content manager application 132) may be configured to vary the order in which the commercial CDR products are applied to the different file types. Example file types may include a Microsoft word document (e.g., .doc), a PowerPoint file type (e.g., .ppt), and the like. Based on a determination of a file type (e.g., via the risk content manager application 132), the order of application of the commercial CDR products to achieve a CDR tool may be determined. For example, a logic table may include the following:

| File Type | First commercial CDR product applied | Second commercial CDR product applied |
|---|---|---|
| FT1 (e.g., .doc file type) | CDR1 | CDR2 |
| FT2 (e.g., .ppt file type) | CDR2 | CDR1 |
| FTN (e.g., a non-defined file type, a default setting) | CDR1 | CDR2 |

Aspects of the disclosure include the risk content manager application 132 being configured to enable recursive CDR tool setting enablement via. Each CDR tool may include a plurality of settings that are selectable to remove risk content. The higher the number of settings that are selected the more risk content that can be removed.

For example, the risk content manager application 132 can provide an option to a user to select a base policy (BP). The BP has a first predetermined plurality of commercial CDR product settings that achieve a CDR tool configuration that is referred to as policy that can be enabled. The fewest settings enabled in the commercial CDR products may be referred to as a lowest (L) BP setting. A greater number of enabled settings in the commercial CDR products to achieve the CDR tool corresponds to what may be referred to as a medium (M) BP setting, and all settings enabled corresponds to a high (H) BP setting. For example, these settings may correspond to the base policy setting 3210, second policy setting 3220, and third policy setting 3230 described herein. Within these three settings the computing device 100 (risk content system 130, risk content manager application 132) may be configured to increase the number of enabled CDR settings if the file does not pass static and dynamic inspection to a selected threshold.

For example, assume there are 20 settings available for each commercial CDR product that achieve the CDR tool. Assume the user (e.g., a systems owner, accreditor, administrator, etc.) selects the BP policy with a limited number of settings enabled (i.e., the L BP setting). For example, assume 3 settings were enabled (where little risk content is removed). Also, assume the static indicator settings threshold (TH) was set for a determined confidence level which corresponds to a threshold of 8 indicators (determined from retrospective statistical analysis) found via a static inspection (SI), and dynamic findings via a dynamic inspection (DI) must be benign to pass. The following process described with respect to FIG. 4 can be implemented by the risk content manager application 132.

Figure 4:
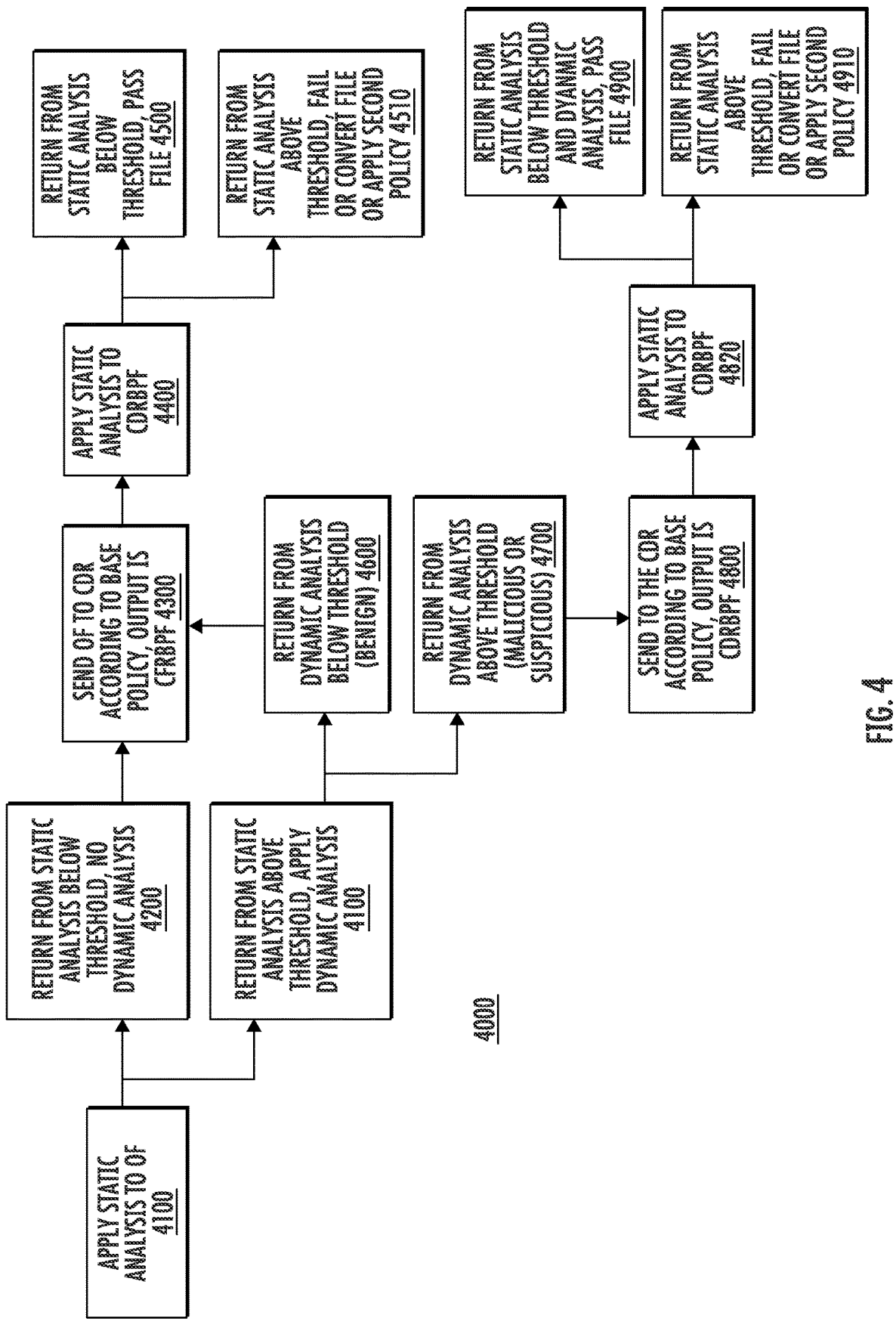
FIG. 4 illustrates an example flow diagram for managing risk content with respect to a file, according to one or more example embodiments of the disclosure.

Referring to FIG. 4, an example flow diagram is shown to illustrate operations for managing risk content with respect to a file. The flow diagram of FIG. 4 illustrates a method 4000 for managing or reducing risk content associated with an electronic file, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, a first operation 4100 may include the computing device 100 (risk content system 130, risk content manager application 132) applying static inspection (SI) or static analysis to an original file (OF). For example, in a first scenario, the OF is sent to SI and an output of the number of indicators is 2. Because the number of indicators is 2, which is less than the threshold value of 8, the static inspection logic is noted as true, or passes. The base policy provides that if the static inspection is true (passes) due to the number of indicators being less than the threshold value, then the computing device 100 (risk content system 130, risk content manager application 132) may be configured to not carry out a dynamic inspection, as illustrated in operation 4200. The original file is then sent to processing by the CDR tool and a base policy (CDRBP) is enacted by the computing device 100 (risk content system 130, risk content manager application 132) at operation 4300. The output of sending the original file through the CDR tool process is referred to as CDRBPF as indicated at operation 4300. The computing device 100 (risk content system 130, risk content manager application 132) may be configured to send the CDRBPF to SI at operation 4400. For example, if an output is less than the threshold value, the static inspection is noted as true (passes), and the file orchestration manager enacts the work flow so the CDR tool processed file exits as indicated at operation 4500. For example, if the OF detection process output is 1 indicator, which is less than the threshold value of 8, the static inspection logic is true (passes), and the computing device 100 work flow is such the CDR tool processed file is provided to the output condition and the job is completed, the process exits. In some implementations, if the output is greater than the threshold value, at operation 4510 the static inspection fails and the file may be failed or converted to another format, or a different policy may be applied.

The base policy may also provide that if the static inspection does not pass due to the number of indicators being greater than the threshold value, then the computing device 100 (risk content system 130, risk content manager application 132) is configured to carry out the dynamic inspection, as illustrated in operation 4210. For example, in a second scenario, the original file is sent to SI and an output of the number of indicators is 10. Because the number of indicators is 10, which is more than the threshold value of 8, the logic is false and the computing device ensures the OF is sent for dynamic inspection. If a result of the dynamic inspection is benign (B), the computing device 100 (risk content system 130, risk content manager application 132) is configured to send the original file to CDR processing at operation 4600. The output of sending the original file through the CDR process is referred to as CDRBPF. The computing device 100 (risk content system 130, risk content manager application 132) is configured to send the CDRBPF to SI and in the example described herein, an output is 6 indicators. Because the DI result was benign (B) and the number of indicators is 6, which is less than the threshold value of 8, the static inspection passes, and the file is passed and the process exits.

In a third scenario, the original file may be sent to SI and the output of the number of indicators is 15. Because the number of indicators is 15, which is more than the threshold value of 8, the logic is false, computing device 100 (risk content system 130, risk content manager application 132) is configured to send the OF for dynamic inspection. If a result of the dynamic inspection is malicious (M), the computing device 100 (risk content system 130, risk content manager application 132) may be configured to send the original file to CDR processing at operation 4700. The output of sending the original file through the CDR tool process is referred to as CDRBPF as indicated at operation 4800. In this example scenario, CDRBPF is then sent to SI at operation 4820. For example, the output may be 10 indicators. Because the DI result was M and the number of indicators is 10, which is more than the threshold value of 8, the static inspection does not pass and the CDRBPF is not allowed to be released. This means more risk content needs to be removed to meet SI and DI threshold values to pass. Therefore, in response to the static inspection and dynamic inspection not passing, at operation 4910 the computing device 100 (risk content system 130, risk content manager application 132) is configured to change the CDR policy, for example by switching to a second policy for the CDR process, e.g., CDR2P, in which more settings are implemented, or to fail the file, or to convert the file to another format. For example, assume the number of settings enabled is changed from 3 to 5. The CDRBPF is then sent to CDR2P, and the output is CDR2PF. In this example, the CDR2PF is then sent to SI, the return is 7, which is less than the threshold value of 8, and therefore CDR2PF passes the static inspection. In the example, the CDR2PF is sent to DI and a result is benign. Accordingly, the computing device 100 (risk content system 130, risk content manager application 132) passes the file and exits the process. For example, the output may be less than the threshold value, and the policy may provide that for a malicious file where the static inspection passes, the CDRBPF is allowed to be released at operation 4900.

In a fourth scenario, the computing device 100 (risk content system 130, risk content manager application 132) is configured to send the original file to SI and an output of the number of indicators is 13. Because the number of indicators is 13, which is more than the threshold value of 8, the OF is sent for dynamic inspection. If a result of the dynamic inspection is suspicious(S), the original file is sent to CDR processing. The output of sending the original file through the CDR process is referred to as CDRBPF. In this example scenario, CDRBPF is then sent to SI and an output is 11 indicators. Because the DI result was S and the number of indicators is 11, which is more than the threshold value of 8, the static inspection does not pass and the CDRBPF is not allowed to be released. This means more risk content needs to be removed to meet SI and DI threshold values to pass. Therefore, in response to the static inspection and dynamic inspection not passing, the computing device 100 (risk content system 130, risk content manager application 132) is configured to change the CDR policy, for example by switching to a second policy for the CDR process, e.g., CDR2P, in which more settings within the CDR tool are implemented. For example, assume the number of settings enabled is changed from 3 to 5. The CDRBPF is then sent to CDR2P and the output is CDR2PF. In this example, the CDR2PF is then sent to SI, the return is 10, which is more than the threshold value of 8, and the result of DI is suspicious. Therefore, in response to the static inspection and dynamic inspection not passing again, the computing device 100 (risk content system 130, risk content manager application 132) is configured to change the CDR policy again, for example by switching to a third policy for the CDR process, e.g., CDR3P, in which more settings within the CDR tool are implemented. For example, assume the number of settings enabled within the CDR tool is changed from 5 to 7. The CDRBPF is then sent to CDR3P and the output is CDR3PF. In this example, the CDR3PF is then sent to SI, the return is 6, which is less than the threshold value of 8, the logic is true. Therefore, CDR3PF passes the static inspection. CDR2PF is sent to DI and a result is benign.

Accordingly, the risk content manager application 132 passes the file and exits the process.

In a fifth scenario, the original file is sent to SI and an output of the number of indicators is 13. Because the number of indicators is 13, which is more than the threshold value of 8, the computing device 100 (risk content system 130, risk content manager application 132) sends the OF for dynamic inspection. If a result of the dynamic inspection is suspicious (S), the computing device 100 (risk content system 130, risk content manager application 132) sends the original file to CDR processing. The output of sending the original file through the CDR process is referred to as CDRBPF. In this example scenario, the computing device 100 (risk content system 130, risk content manager application 132) sends the CDRBPF to SI and an output is 11 indicators. Because the DI result was S and the number of indicators is 11, which is more than the threshold value of 8, the static inspection does not pass and the CDRBPF is not allowed to be released. This means more risk content needs to be removed to meet SI and DI threshold values to pass. Therefore, in response to the static inspection and dynamic inspection not passing, the computing device 100 (risk content system 130, risk content manager application 132) is configured to change the CDR policy, for example by switching to a second policy for the CDR process, e.g., CDR2P, in which more settings are implemented. For example, assume the number of settings enabled is changed from 3 to 5. The CDRBPF is then sent to CDR2P and the output is CDR2PF. In this example, the computing device 100 (risk content system 130, risk content manager application 132) sends the CDR2PF to SI, the return is 10, which is more than the threshold value of 8, and the result of DI is suspicious. Therefore, in response to the static inspection and dynamic inspection not passing again, the computing device 100 (risk content system 130, risk content manager application 132) is configured to change the CDR policy again, for example by switching to a third policy for the CDR process, e.g., CDR3P, in which more settings are implemented. For example, assume the number of settings enabled is changed from 5 to 7. The computing device 100 (risk content system 130, risk content manager application 132) then sends the CDRBPF to CDR3P and the output is CDR3PF. In this example, the CDR3PF is then sent to SI, the return is 9, which is more than the threshold value of 8. Therefore, CDR3PF does not pass the static inspection. The computing device 100 (risk content system 130, risk content manager application 132) sends the CDR2PF to DI and the result remain suspicious. In this scenario, no further CDR policies are available (or a number of changes to the CDR policies is capped to a predetermined limit such as three), the computing device 100 (risk content system 130, risk content manager application 132) notes the logic as false. In some implementations, the computing device 100 (risk content system 130, risk content manager application 132) rule set (policy configuration) is enacts a work flow that takes the original file and converts the file to another format which is unlikely to support malware in the conversion (e.g., a JPEG format) and passes the converted file to the intended recipient and exits the process or have a workflow in which a notification is sent via a file delivery. In some implementations the rule set (policy configuration) enacts a workflow in which an external process is evoked to inform external agents of the condition and a file is not provided to an exit process. This might be materialized by the computing device 100 evoking an email to a systems administrator informing of conditions.

Accordingly, aspects of the disclosure include implementing a recursive CDR policy setting. For example, CDR tool policy settings may be changed from CDRBP to CDR2P to CDR3P (and so on) based on the results from prior static and dynamic inspections. As described previously, the threshold value for the number of indicators (or similar metric) which is utilized for determining whether or not a static inspection is passed can be determined based on a selected confidence level from prior statistical analyses of known files (e.g., prior statistical analyses of clean and "dirty" files). For example, the confidence levels may include levels of increasing statistic validation based on retrospective analysis (e.g., 80%, 90%, and 98%) confidence. However, other confidence levels can be implemented. A generalized logic table for the above-described scenarios is provided below:

| Case # | Input File Name | Pre-CDR Inspection Process | Pre-CDR Inspection Process Return, above (A) or below threshold (B) | CDR tool process | Output File Name | Post CDR Tool Risk Inspection Process | Post CDR Risk Inspection Process Return, above or below threshold | Result |
|---|---|---|---|---|---|---|---|---|
| 1 | Original File (OL) | SI | B | CDRBP | CDRBPF | SI | B | Pass file |
| 2 | OL | SI | A | | | | | |
| | | DI | S | CDRBP | CDRBPF | SI | B | |
| | | | | | | DI | B | Pass file |
| 3 | OL | SI | A | | | | | |
| | | DI | M | CDRBP | CDRBPF | SI | A | |
| | | | | | | DI | S | Change CDR policy to 2P |
| | CDRBPF | SI | A | | | | | |
| | | DI | S | CDR2P | CDR2PF | SI | B | |
| | | | | | | DI | B | Pass file |
| 4 | OL | SI | A | | | | | |
| | | DI | M | CDRBP | CDRBPF | SI | A | |
| | | | | | | DI | S | Change CDR policy to 2P |
| | CDRBPF | SI | A | | | | | |
| | | DI | S | CDR2P | CDR2PF | SI | A | |
| | | | | | | DI | S | Change CDR policy to 2/3P |
| | CDR2PF | SI | A | CR3P | CDR3PF | SI | B | |
| | | DI | S | | | DI | B | Pass file |
| 5 | OL | SI | A | | | | | |
| | | DI | M | CDRBP | CDRBPF | SI | A | |
| | | | | | | DI | S | Change CDR policy to 2P |
| | CDRBPF | SI | A | | | | | |
| | | DI | S | CDR2P | CDR2PF | SI | A | |
| | | | | | | DI | S | Change CDR policy to 2/3P |
| | CDR2PF | SI | A | CR3P | CDR3PF | SI | A | |
| | | DI | S | | | DI | S | Either convert file to format with no risk content like image (JPEG) or block or pass - user selected logic |

Figure 5:
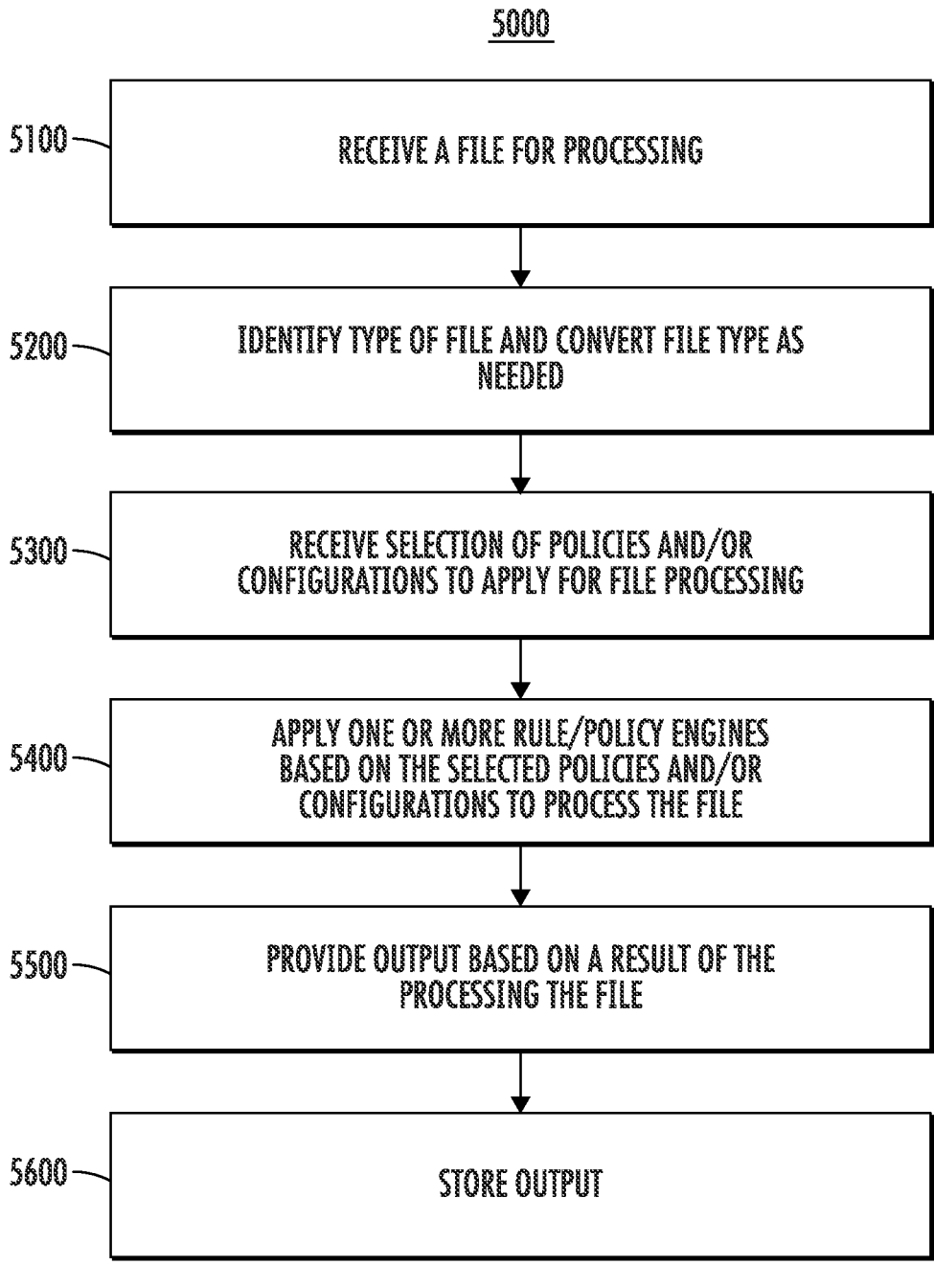
FIG. 5 illustrates a flow diagram of an example, non-limiting computer implemented method, according to one or more example embodiments of the disclosure.

Examples of the disclosure are also directed to computer implemented methods for managing risk content of a file. FIG. 5 illustrates a flow diagram of an example, nonlimiting computer-implemented method, according to one or more example embodiments of the disclosure. The flow diagram of FIG. 5 illustrates a method 5000 for managing or reducing risk content associated with an electronic file, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Example operations of the method for managing risk content of a file may include components relating to an intake process, output process, orchestration, file type determination, file type conversion, policy or configuration setting component for all components/risk tolerance setting interface, file detection, risk content removal, analytic engine, and storage.

Referring to FIG. 5, at operation 5100 the method 5000 includes computing device 100 receiving an electronic file for processing during an intake process. The intake process may include placing files in a directory or a file share process where computing device 100 queries a directory or other computing device which shares the file. For example, the intake process can include systems call using an addressing scheme like http/https, FTP, and initiate a session in which the electronic file is delivered to the computing device 100. An intake policy may include rules which are specified for particular file types.

At operation 5200 the method 5000 includes computing device 100 identifying the type of file being processed and converting the file type if needed, before applying the one or more rule/policy engines based on the selected policies and/or configurations to process the file. For example, the file may be identified by determining the electronic file format by application of the Internet Engineering Task Force Request for Comment (IETF RFC) nomenclature. For example, file type conversion changes the file format into another format per policy settings (e.g., according to a first policy such as the base policy or some selected policy setting) for ease of processing (e.g., from doc to docx, ppt to pptx, exl to exlx, and the like). This conversion is useful in providing the CDR processing tools a file in a format conducive to decomposition and inspection.

At operation 5300 the computing device 100 can receive one or more selections of policies and/or configurations to apply to the file for processing. For example, the computing device 100 may receive a selection of at least one of a depth of risk content removal or a confidence level associated with the risk content removal in which the electronic file satisfies a threshold confidence value. For example, the selections can be received via one or more inputs from a user via the risk content manager application 132 and risk content management console 3100 selecting policies and/or configurations to apply to the file for processing. For example, one or more commercial CDR products may be assembled to provide a CDR tool may be selected for removing risk content from a file via CDR manager 134 and a desired confidence level can be selected via malware detection analysis manager 136. In some implementations, orchestrated workflow default policies and/or configurations to apply to the file for processing may be set and applied automatically by the computing device 100 (risk content system 130, risk content manager application 132). The computing device 100 (risk content system 130, risk content manager application 132) can be configured to provide a user interface to receive one or more inputs selecting the at least one of the depth of risk content removal or the confidence level associated with the risk content removal in which the electronic file satisfies the threshold confidence value. FIG. 3B illustrates an example user interface by which a user can select a level of depth and risk content removal according to a plurality of different options, and by which a user can select a confidence level with associated dynamic analysis requirements. For example, the computing device 100 (risk content system 130, risk content manager application 132) may be configured to automatically select a depth of risk content removal and/or a confidence level, based on a default setting, based on user preferences regarding a tolerance preference, based on an organization's preferences regarding a tolerance preference, based on a file type, based on a file size, based on a source (sender) of the file, based on a history of receiving similar files, based on a history of receiving files from the sender, based on time limitations for processing the electronic file, based on computing resource limitations of the computing device 100, etc.

For example, a user may select one or more CDR tool policy levels including a risk content removal level or value (e.g., low, medium, high) and set a sensitivity threshold level or value for static indicators (e.g., L (80%), M (90%), H (98%)) and set dynamic indicators threshold to pass (e.g., 1 (benign) or 2 (suspicious) or 3 (malicious)). A user may select a CDR tool policy, for example, from among the eleven CDR tool policy settings discussed above. As an example, an input of 5/M/1 may correspond to a CDR tool policy setting/risk content removal depth and sensitivity level/dynamic indicator threshold. For example, 5=a low depth of risk content removal for CDR tool settings enabled, M=medium sensitivity in static indicators for passing the file, where confidence is 90% for passing the file, and 1=the dynamic indicators must be benign to pass the tolerance check. Example settings may include at least 54 logically possible settings based on six CDR tool policy enforcement options, three static indicator sensitivity levels (e.g., 80%, 90%, and 98%), and three dynamic settings (benign, suspicious, and malicious). Each of the threshold confidence values may be determined values obtained from retrospective analysis of a plurality of electronic files. For example, the following settings may be possible:

| Setting Number, of the 11 Risk Content Removal Depth Settings | Setting |
|---|---|
| Setting #1: Detection Only, No Risk Content Removal, Threshold Enforced | 1/L/1 |
| | 1/L/2 |
| | 1/M/1 |
| | 1/M/2 |
| | 1/H/1 |
| | 1/H/2 |
| Setting #2: Detection Only, No Risk Content Removed, Pass All Original Files | 2/NA/NA |
| Setting #3: Only Structural Risk Content Removed, Threshold Enforced | 3/L/1 |
| | 3/L/2 |
| | 3/M/1 |
| | 3/M/2 |
| | 3/H/1 |
| Setting #4: Only Structural Risk Content Removed, Pass All Files | 4/NA/NA |
| Setting #5: Low Depth of Risk Content Removal | 5/L/1 |
| | 5/L/2 |

-continued

| Setting Number, of the 11 Risk Content Removal Depth Settings | Setting |
|---|---|
| | 5/M/1 |
| | 5/M/2 |
| | 5/H/1 |
| Setting #6: Medium Depth of Risk Content Removal | 6/L/1 |
| | 6/L/2 |
| | 6/M/1 |
| | 6/M/2 |
| | 6/H/1 |
| Setting #7: Highest Depth of Risk Content Removal | 7/M/1 |
| | 7/H/1 |
| Setting #8: Convert File to Benign Format | 8/NA/NA |
| Setting #9: Risk Content Removal Only, Threshold Not Enforced - Low Depth | 9/NA/NA |
| Setting #10: Risk Content Removal Only, Threshold Not Enforced - Medium Depth | 10/NA/NA |
| Setting #11: Risk Content Removal Only, Threshold Not Enforced - Highest Depth | 11/NA/NA |

At operation 5400 the computing device 100 is configured to apply one or more rule/policy engines based on the selected policies and/or configurations to process the file. For example, the computing device 100 may be configured to apply one or more policies based on the selection to process the electronic file by selectively implementing an iterative routine. The iterative routine can include: removing risk content from the electronic file according to a first policy by implementing a first content and disarm (CDR) tool configuration (policy) to obtain a first processed electronic file. In response to a first inspection with respect to the first processed electronic file indicating the first processed electronic file does not satisfy one or more predetermined conditions, the computing device 100 can remove additional risk content from the first processed electronic file according to a second policy by implementing a second CDR tool configuration (policy) to obtain a second processed electronic file. In response to the first inspection indicating the first processed electronic file satisfies the one or more predetermined conditions, the computing device 100 can pass the electronic file. The iterative routine can further include: in response to a second inspection with respect to the second processed electronic file indicating the second processed electronic file does not satisfy the one or more predetermined conditions, the computer device 100 removing further risk content from the second processed electronic file according to a third policy implemented by a third CDR tool policy setting (configuration of settings within the individual commercial CDR products that constitute the CDR tool) to obtain a third processed electronic file, and in response to the second inspection indicating the second processed electronic file satisfies the one or more predetermined conditions, the computing device 100 can pass the electronic file. The first CDR tool policy and second CDR tool policy may be determined by the computing device 100 (risk content system 130, risk content manager application 132) based on the file type. The second CDR tool policy has a greater number of settings enabled to remove the additional risk content from the first processed electronic file according to the second policy than a number of settings enabled by the first CDR tool policy to remove the risk content from the electronic file according to the first policy. The third CDR tool policy has a greater number of settings enabled to remove the further risk content from the second processed electronic file according to the third policy than a number of settings enabled by the second CDR tool policy to remove the additional risk content from the first processed electronic file according to the second CDR tool policy. A CDR tool may employ one or more commercial CDR products. The commercial CDR products may be configured so that the output of one is the input to a second. This is a CDR commercial product series configuration. Associated multiple commercial CDR products can be referred to as the CDR tool. A first CDR tool can refer to the associated commercial CDR products aligned according to an initial configuration of settings for each commercial CDR product. The second and third CDR tools can refer to the associated commercial CDR products aligned according to a subsequent configuration of settings for each commercial CDR product. The first, second, and third CDR tool policies can refer to the configuration settings of the commercial CDR products aligned in series. The iterative routine may involve multiple policies, and are not limited to the three described above.

The first inspection can include a static inspection of the first processed electronic file, and the one or more predetermined conditions include a result of the static inspection having an output of a number of indicators being less than a threshold indicator value. For example, a threshold indicator value may be 8, and when the static inspection results in the number of indicators being 6 the static inspection passes, and the associated predetermined condition is satisfied and the file may be passed on (e.g., for further processing if needed). The associated predetermined conditions are not satisfied when the first inspection with respect to the first processed electronic file includes a result of the static inspection having an output of a number of indicators being greater than the threshold indicator value. In some implementations, the first inspection includes a dynamic inspection of the first processed electronic file when the result of the static inspection has the output of the number of indicators being more than the threshold indicator value, and the one or more predetermined conditions include a result of the dynamic inspection being a benign dynamic finding. For example, a threshold indicator value may be 8, and when static inspection results in the number of indicators being 12 the static inspection fails, and the computing device 100 (risk content system 130, risk content manager application 132) performs the dynamic inspection. If a result of the dynamic inspection is benign (B), the associated predetermined condition is satisfied and the computing device 100 (risk content system 130, risk content manager application 132) may be configured to pass on the electronic file (e.g., for further processing if needed). The associated predetermined condition is not satisfied when the first inspection with respect to the first processed electronic file includes a result of the dynamic inspection being a malicious finding or a suspicious finding.

At operation 5500 the computing device 100 may provide an output based on a result of processing the file according to the applied one or more rule/policy engines. For example, the computing device 100 (risk content system 130, risk content manager application 132) may pass the file, may fail the file, or may convert the file, according to a result of the processing. For files that are passed, the processed file retains the format of the original file. For files that are converted rather than failed, the file may be converted to a benign format (i.e., a re-fry conversion). The output may also include additional information including a risk index score for the output file and/or a summary report of files processed.

For example, because the number of indicators is correlated to the probability a file is malicious or suspicious from the analysis of prior known malicious samples, there can be an inference made to the cost to the organization if the original file was passed and embedded malware activated. This is termed the original file current risk exposure (CRE). The cost of responding and recovering from an incident (investigation of indicators of compromise or violation of security policy) costs may be estimated based on timely industry reports (e.g., of about $15,000 and is documented in many studies, such as Cyentia Institutes Risk Insights Study of 2020 and 2022). An average cost of a breach (confirmed security policy violation) may also be estimated (e.g., $170,000). Based on information relating to a percentage of files that are suspected to be suspicious and/or malicious, and information relating to probabilities associated with such files causing an incident and/or breach (using limited information provided by the target system staff), the computing device 100 can estimate (determine) potential costs associated with processing a number of files (e.g., based on a number of workdays, number of employees, number of files expected to be received each day per employee, etc.) and can estimate (determine) a return on investment to implement the risk management application. Of note is the effectiveness of detection technology; new malware is unobservable until behavior is found, generally after 72-100 hours post introduction into the Internet-connected ecosystem. End point protection systems are often ineffective for young malware. The email current risk exposure (ECRE) calculation is based on the measured fraction of suspicious and malicious content using techniques described herein, the expected cost of an incident and breach, amount of digital files per ECRE period (e.g., in a day, in a month, in a year, etc.) and a probability the network protection elements will be defeated. The computing device is configured to determine the ECRE calculation with distribution weights for 0-72 hours, 72-100 hour, etc., increments in which network effectiveness alters. Information related to the presence and types of protection tools is useful in the estimation of likelihood of risk content instigating an incident and/or breach. The ECRE calculation uniquely expresses the found risk content fraction into an estimated cost for response and recovery from incidents and breaches. CDR processing measurably reduces the fraction of risk content and so provides a CDR Processed ECRE value in contrast to the original files ECRE. Therefore, as part of managing risk content, the computing device 100 (risk content system 130, risk content manager application 132) can be configured to calculate an estimated response and recovery cost from ingestion of the electronic file based on based on a probability that the electronic file contains risk content, an amount of electronic files ingested per a predefined time period, a probability that a computing system associated with a user will prevent harm to the computing system when the electronic file contains risk content, and an expected cost of an incident or breach if the computing system does not prevent harm to the computing system when the electronic file contains risk content. The computing device 100 (risk content system 130, risk content manager application 132) can provide, for presentation via a user interface, the estimated response and recovery cost.

At operation 5600 the computing device 100 may store the output including the processed file and any associated reports, for example. For example, the output and reports may be stored in the one or more memory devices 120.

Figure 6:
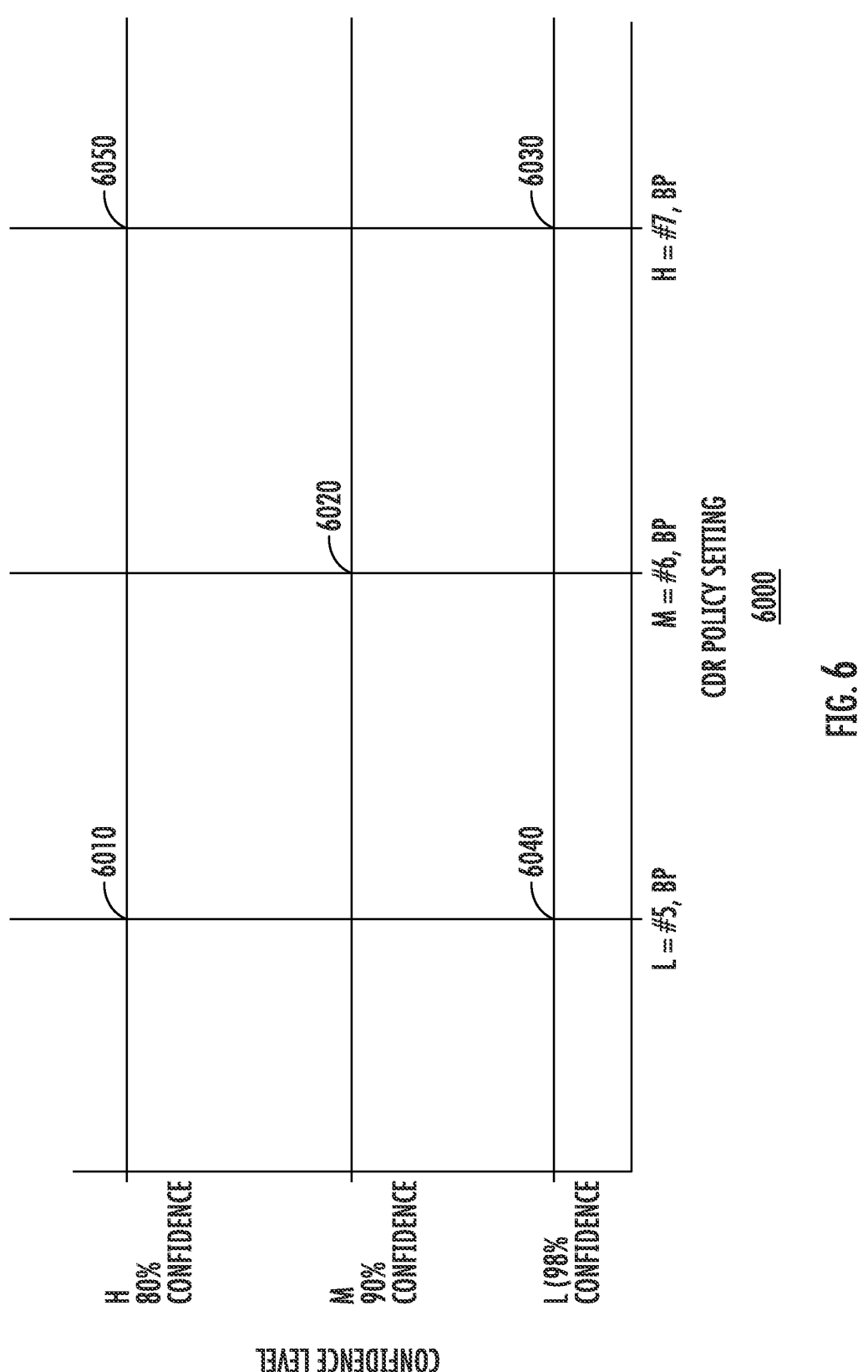
FIG. 6 illustrates an example chart plotting a mapping of CDR base policies and SI threshold levels, according to one or more example embodiments of the disclosure.

FIG. 6 illustrates an example chart plotting a mapping of CDR base policies and SI threshold levels which demonstrate relationships and policies that are useful, according to one or more example embodiments of the disclosure. For example, the y-axis may correspond to a confidence level that is associated with a number of indicators that can be found (a threshold value) for a file to pass static analysis. A higher confidence level is associated with a low number of indicators while a lower confidence level is associated with a high number of indicators. For example, the x-axis may correspond to a CDR policy setting (e.g., L-a low policy setting with few CDR tool settings enabled, M-a medium policy setting with a medium number of CDR tool settings enabled, and H-a high policy setting a high number of CDR tool settings enabled. Each systems policy setting include determination of the CDR tool configuration of enforcement setting and may include a plurality of sub-settings (e.g., three sub-settings corresponding to a base policy, 2P policy, and 3P policy). In FIG. 6, point 6010 reflects a setting in which a set of files is examined, and a low amount of risk content is removed (e.g., the least number of CDR tool settings enabled that is implemented and having the lowest user impact) and a lowest confidence level in risk content removed is set (e.g., 80% confidence level). Point 6010 reflects a lowest security setting but has the least user impact and may be used as a starting point. In FIG. 6, point 6020 reflects a setting in which a medium amount of risk content is removed (a medium number of CDR tool settings implemented and having some user impact) and a medium confidence level in risk content removed is set (e.g., 90% confidence level). Point 6020 reflects a modest security setting having some user impact and may be a compromise between point 6010 and point 6030. In FIG. 6, point 6030 reflects a setting in which a highest amount of risk content is removed from a sample set of files (a highest number of CDR tool settings implemented and having the greatest user impact) and a high confidence level in risk content removed is set (e.g., 98% confidence level). Point 6030 reflects the greatest security setting having the highest potential for user impact. Other points on the chart include point 6040 and point 6050. Point 6040 reflects a setting in which a low amount of risk content is removed from a sample set of files (a low number of CDR tool settings are implemented and having a lowest user impact) and a high confidence level risk content removed is set (e.g., 98% confidence level). However, such a setting may not be reasonable given that little risk content is removed while a high confidence level is required, which are mutually exclusive ideas. Point 6050 reflects a setting in which a high amount of risk content is removed (a high number of CDR tools are implemented) and a low confidence level in risk content removed is set (e.g., 80% confidence level). However, such a setting may not be reasonable given that a high amount risk content is removed while a low confidence level is required, which are mutually exclusive ideas.

Figure 7:
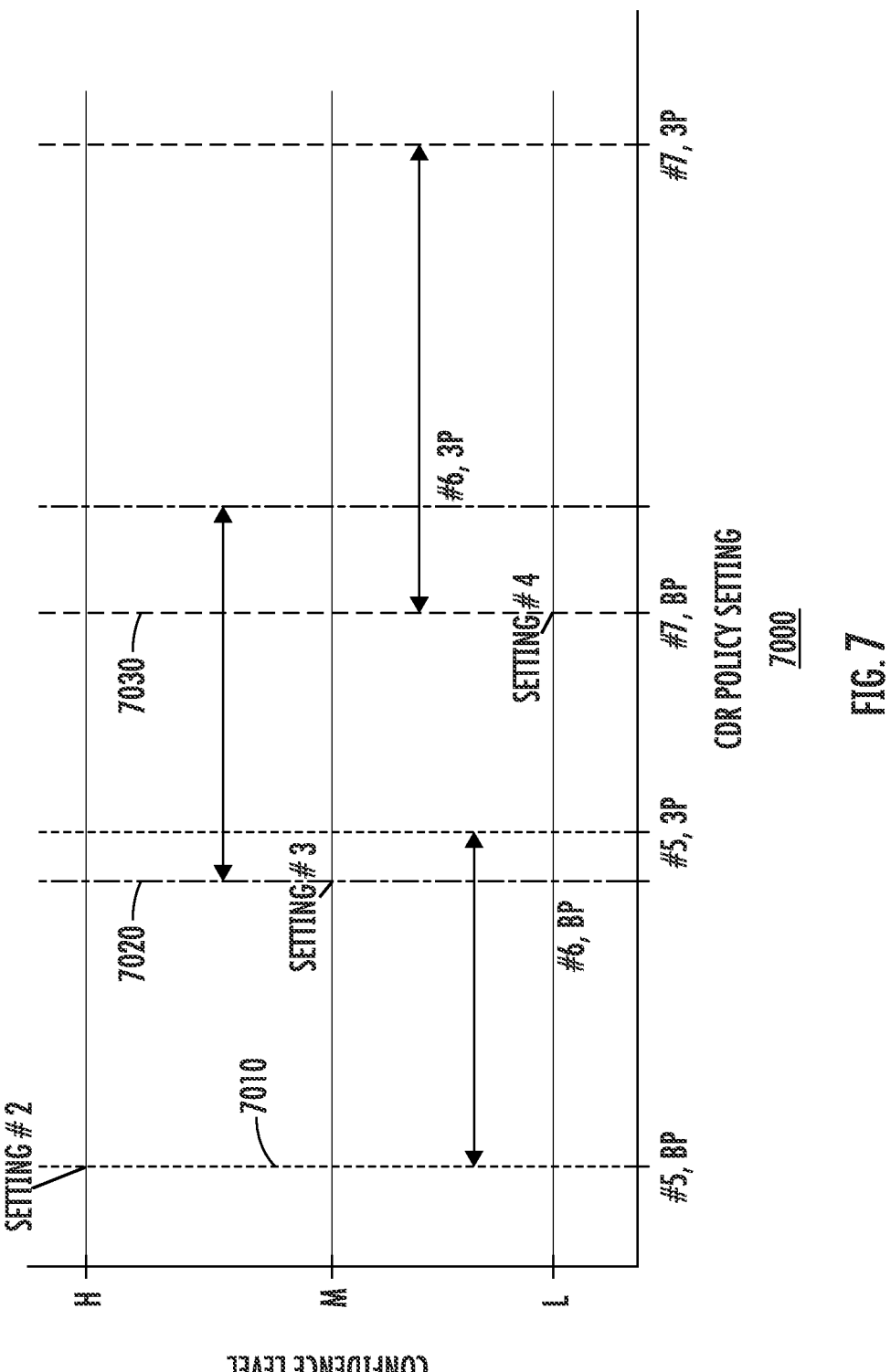
FIG. 7 illustrates an example chart plotting a mapping of CDR base policies and a third policy (3P) and SI threshold levels, according to one or more example embodiments of the disclosure.

FIG. 7 illustrates an example chart plotting a mapping of CDR tool base policies and a third CDR tool policy (3P) and SI threshold levels which demonstrate relationships and policies that are useful, according to one or more example embodiments of the disclosure. In FIG. 7, line 7010 reflects a first setting in which a low amount of risk content is removed from a sample set of files as part of the base policy and as additional policies are implemented (e.g., from the base policy to a second policy and from the second policy to the third policy), a greater amount (e.g., a medium amount) of risk content is removed. In FIG. 7, line 7020 reflects a second setting in which a low-medium amount of risk content is removed as part of the base policy and as additional policies are implemented (e.g., from the base policy to a second policy and from the second policy to the third policy), a greater amount (e.g., a medium-high amount)

of risk content is removed. In FIG. 7, line 7030 reflects a third setting in which a medium amount of risk content is removed as part of the base policy and as additional policies are implemented (e.g., from the base policy to a second policy and from the second policy to the third policy), a greater amount (e.g., a high amount) of risk content is removed.

Figure 8:
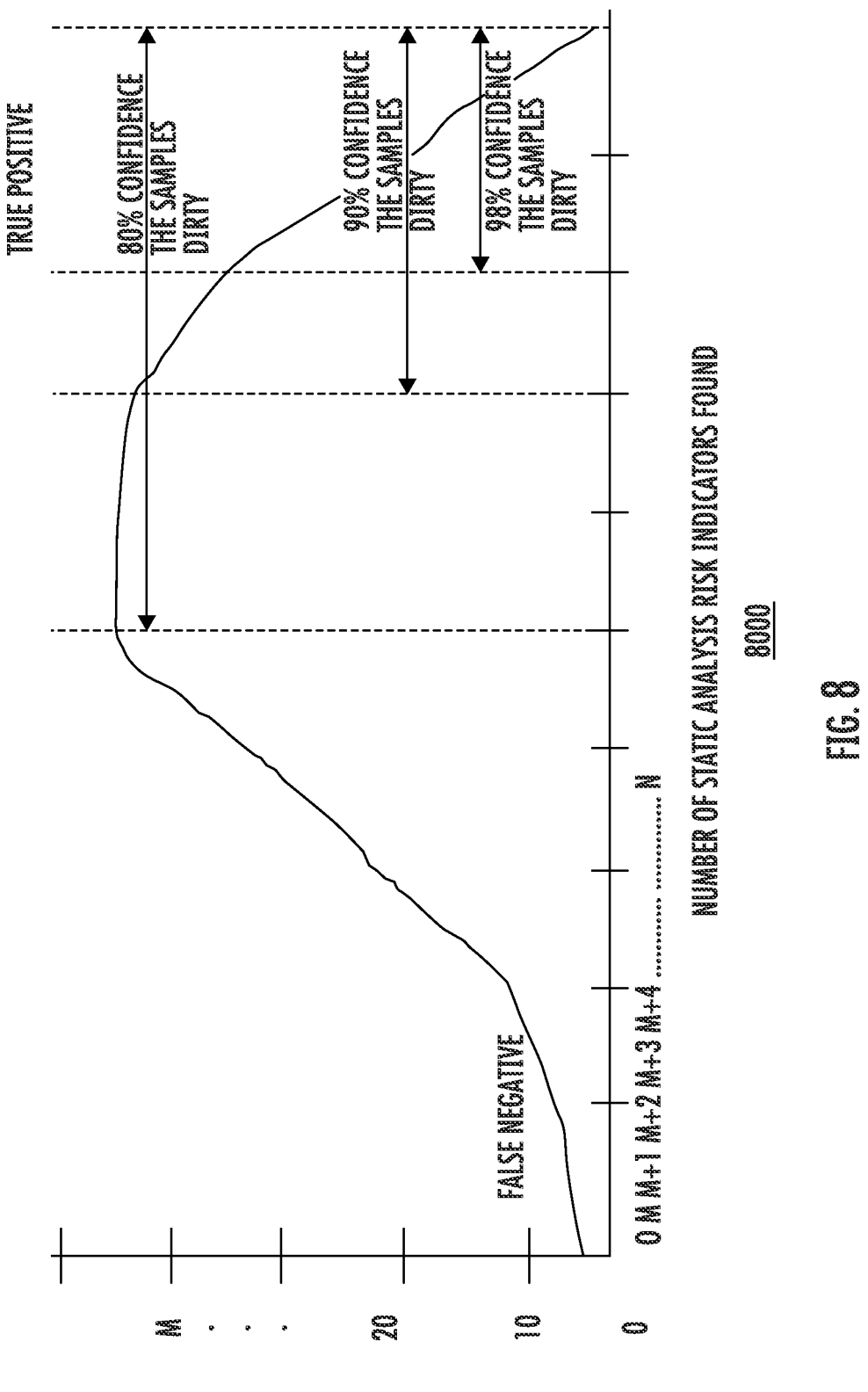
FIG. 8 illustrates an example graph demonstrating a relationship of a confidence level relative to risk content from static indicators and dynamic indicators for dirty files, according to one or more example embodiments of the disclosure.
Figure 9:
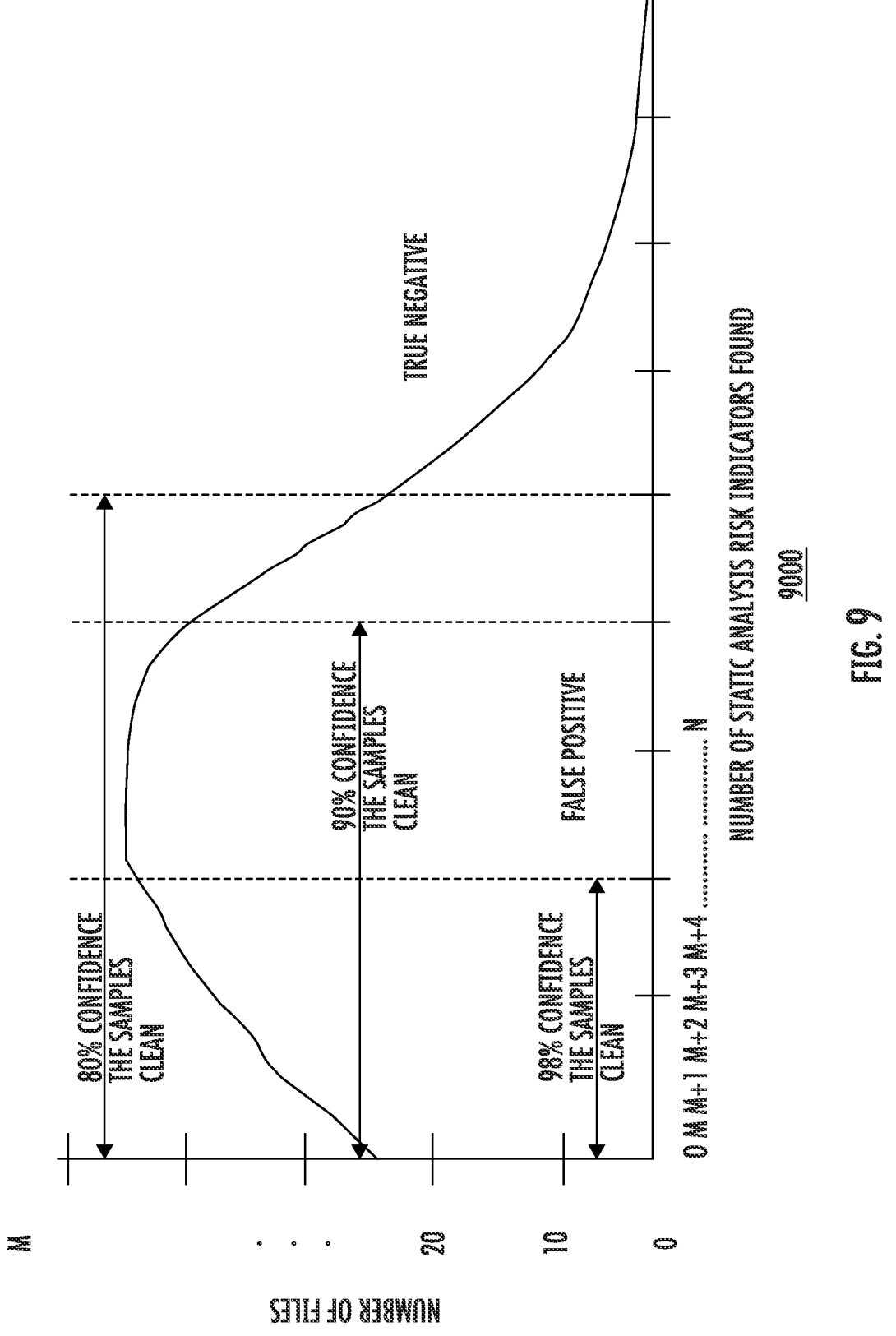
FIG. 9 illustrates an example graph demonstrating a relationship of a confidence level relative to risk content from static indicators and dynamic indicators for clean files, according to one or more example embodiments of the disclosure.

FIG. 8 illustrates an example graph 8000 demonstrating a relationship of a confidence level relative to risk content from static indicators and dynamic indicators for known malicious files (i.e., files having malware). FIG. 9 illustrates an example graph 9000 demonstrating a relationship of a confidence level relative to risk content from static indicators and dynamic indicators for known clean files (i.e., files without malware). The computing device 100 may be configured to utilize the data associated with the graphs from FIGS. 8 and 9 to determine confidence levels in a CDR processed file. For example, the computing device 100 may be configured to determine confidence levels (e.g., 98%, 90%, 80%, etc.) based on retrospective analysis of sets of files. Known malicious and known clean files may be constructed specifically for this use by a participating agent.

Aspects of the above-described example embodiments have been described with respect to the computing device 100. However, those aspects may also be implemented with respect to the server computing system 300. For example, operations described with respect to risk content system 130 and components thereof may be partly or fully implemented by the risk content system 330 and components thereof. As a non-limiting example, computing device 100 may access risk content manager application 332 (for example, via a portal or a web site, etc.) to perform operations which have been described as performed via risk content manager application 132. As other non-limiting examples, computing device 100 may access CDR tool manager 334 (for example, via a portal or web site, etc.) to perform operations which have been described as being performed via CDR tool manager 134, access detection analysis manager 336 (for example, via a portal or web site, etc.) to perform operations which have been described as being performed via detection analysis manager 136, or access risk content policy setter 338 (for example, via a portal or a web site, etc.) to perform operations which have been described as being performed via risk content policy setter 138.

To the extent terms including "module", and "unit," and the like are used herein, these terms may refer to, but are not limited to, a software or hardware component or device, for example a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, including software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media including hard disks, floppy disks, and magnetic tape; optical media such as CD ROM disks, Blue-Ray disks, and DVDs; magneto-optical media such as optical discs; and other hardware devices that are specially configured to store and perform program instructions, including semiconductor memory, read-only memory (ROM), random access memory (RAM), flash memory, USB memory, and the like. Examples of program instructions include both machine code, for example produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, and not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computer-implemented method, comprising:
   receiving, by one or more processors, a set of electronic files;
   receiving, by the one or more processors, a selection of at least one of a depth of risk content removal and a confidence level associated with the risk content removal in which the electronic files satisfy a threshold confidence value, wherein the confidence level associated with the risk content removal in which each electronic file satisfies the threshold confidence value is selected from a plurality of confidence levels corresponding to respective threshold confidence values and the threshold confidence values include at least a first threshold confidence value, a second threshold confidence value which is greater than the first threshold confidence value, and a third threshold confidence value which is greater than the second threshold confidence value and further wherein each of the threshold confidence values are determined values obtained from retrospective analysis of a plurality of different electronic files; and applying, by the one or more processors, one or more policies based on the selection to process the electronic files by selectively implementing an iterative routine, the iterative routine including:

removing risk content from the electronic files according to a first policy by implementing a first content and disarm (CDR) tool policy to obtain processed electronic files;

performing a first inspection of the electronic files;

in response to the first inspection for the processed electronic files that do not satisfy one or more predetermined conditions, removing additional risk content from those processed electronic files according to a second policy by implementing a second CDR tool policy to obtain second processed electronic files, and in response to the first inspection, passing the electronic files that correspond to processed electronic files that satisfy the one or more predetermined conditions.

2. The computer-implemented method of claim 1, further comprising identifying a file type of each electronic file.

3. The computer-implemented method of claim 2, wherein the file type of each electronic file is determined based on request for comments nomenclature.

4. The computer-implemented method of claim 2, further comprising, based on the identified file type of each electronic file, converting the electronic file from a first file type to a second file type before removing the risk content from the electronic file according to the first policy.

5. The computer-implemented method of claim 1, wherein the first inspection includes a static inspection, and the one or more predetermined conditions include a result of the static inspection having an output of a number of indicators being less than a threshold indicator value.

6. The computer-implemented method of claim 5, wherein the first inspection includes a dynamic inspection when the result of the static inspection has the output of the number of indicators being more than the threshold indicator value, and the one or more predetermined conditions include a result of the dynamic inspection being a benign dynamic finding.

7. The computer-implemented method of claim 1, wherein the one or more predetermined conditions are not satisfied when the first inspection includes a result of a static inspection having an output of a number of indicators being greater than a threshold indicator value.

8. The computer-implemented method of claim 1, wherein the one or more predetermined conditions are not satisfied when the first inspection includes a result of a dynamic inspection being a malicious finding or a suspicious finding.

9. The computer-implemented method of claim 1, wherein the second CDR tool policy has a greater number of settings enabled to remove the additional risk content from the processed electronic files that do not satisfy one or more predetermined conditions according to the second CDR tool policy than a number of settings enabled by the first CDR tool policy to remove the risk content from the electronic files according to the first policy.

10. The computer-implemented method of claim 1, wherein the iterative routine further includes:

in response to a second inspection with respect to the second processed electronic files indicating at least a portion of the second processed electronic files that do not satisfy the one or more predetermined conditions, removing further risk content from the second processed electronic files that do not satisfy the one or more predetermined conditions according to a third policy by implementing a third CDR tool policy to obtain third processed electronic files; or in response to the second inspection indicating a different portion of the second processed electronic files that satisfy the one or more predetermined conditions, passing the electronic files that do satisfy the one or more predetermined conditions.

11. The computer-implemented method of claim 10, wherein the third CDR tool policy has a greater number of settings enabled to remove the further risk content from the second processed electronic files that do not satisfy the one or more predetermined conditions according to the third CDR tool policy than a number of settings enabled by the second CDR tool policy to remove the additional risk content from the electronic files according to the second policy.

12. The computer-implemented method of claim 2, wherein the first CDR tool policy and second CDR tool policy are determined based on the file type.

13. The computer-implemented method of claim 1, further comprising providing, by the one or more processors, a user interface to receive one or more inputs selecting the at least one of the depth of risk content removal or the confidence level associated with the risk content removal.

14. The computer-implemented method of claim 1, further comprising:

calculating an estimated response and recovery cost from ingestion of each electronic file based on two or more of a probability that that electronic file contains risk content, an amount of the electronic files ingested per a predefined time period, a probability that a computing system associated with a user will prevent harm to the computing system when that electronic file contains risk content, and an expected cost of an incident or breach when the computing system does not prevent harm to the computing system when that electronic file contains risk content; and providing, for presentation via a user interface, the estimated response and recovery cost.

15. A computing device, comprising:

at least one memory to store instructions; and at least one processor configured to execute the instructions to perform operations, the operations including:

receiving electronic files;

receiving a selection of at least one of a depth of risk content removal or a confidence level associated with the risk content removal in which the electronic files satisfy a threshold confidence value, wherein the confidence level associated with the risk content removal in which each electronic file satisfies the threshold confidence value is selected from a plurality of confidence levels corresponding to respective threshold confidence values and the threshold confidence values include at least a first threshold confidence value, a second threshold confidence value which is greater than the first threshold confidence value, and a third threshold confidence value which is greater than the second threshold confidence value and further wherein each of the threshold confidence values are determined values obtained from retrospective analysis of a plurality of different electronic files; and applying one or more policies based on the selection to process the electronic files by selectively implementing an iterative routine, the iterative routine including:

removing risk content from the electronic files according to a first policy by implementing a first content and disarm (CDR) tool policy to obtain first processed electronic files;

performing a first inspection of the processed electronic files;

in response to the first inspection for the electronic files that do not satisfy one or more predetermined conditions, removing additional risk content from the processed electronic files according to a second policy by implementing a second CDR tool policy to obtain second processed electronic files and in response to the first inspection, passing the electronic files when corresponding processed electronic files satisfy the one or more predetermined conditions.

16. The computing device of claim 15, wherein the first inspection includes a static inspection of the electronic files and a dynamic inspection of the electronic files when results of the static inspection do not satisfy a first predetermined condition among the one or more predetermined conditions, and the first predetermined condition includes a result of the static inspection having an output of a number of indicators being less than a threshold indicator value, and the one or more predetermined conditions include a second predetermined condition corresponding to the dynamic inspection having a result corresponding to a benign dynamic finding.

17. The computing device of claim 15, wherein the iterative routine further includes:

in response to a second inspection with respect to the second processed electronic files that do not satisfy the one or more predetermined conditions, removing further risk content from the second processed electronic files according to a third policy by implementing a third CDR tool policy to obtain third processed electronic files, and in response to the second inspection, passing the second processed file electronic file.

18. A non-transitory computer-readable medium storing instructions which, when executed by at least one processor, cause the at least one processor to perform operations, the operations including:

receiving electronic files;

receiving a selection of at least one of a depth of risk content removal or a confidence level associated with the risk content removal in which the electronic files satisfy a threshold confidence value, wherein the confidence level associated with the risk content removal in which each electronic file satisfies the threshold confidence value is selected from a plurality of confidence levels corresponding to respective threshold confidence values and the threshold confidence values include at least a first threshold confidence value, a second threshold confidence value which is greater than the first threshold confidence value, and a third threshold confidence value which is greater than the second threshold confidence value and further wherein each of the threshold confidence values are determined values obtained from retrospective analysis of a plurality of different electronic files; and applying one or more policies based on the selection to process the electronic files by selectively implementing an iterative routine, the iterative routine including:

removing risk content from the electronic file according to a first policy by implementing a first content and disarm (CDR) tool policy to obtain first processed electronic files;

performing a first inspection of the processed electronic files;

in response to a first inspection for the processed electronic files that do not satisfy one or more predetermined conditions, removing additional risk content from the electronic files according to a second policy by implementing a second CDR tool policy to obtain second processed electronic files; and in response to the first inspection, passing the electronic files that correspond to processed electronic files that satisfy the one or more predetermined conditions.

* * * * *